(12) United States Patent
Rao et al.

(10) Patent No.: US 8,385,878 B2
(45) Date of Patent: Feb. 26, 2013

(54) SYSTEMS, METHODS, AND APPARATUS FOR ACTIVITY CONTROL IN A WIRELESS COMMUNICATIONS DEVICE

(75) Inventors: Anil S. Rao, San Diego, CA (US); Subramanya P. Rao, Santa Clara, CA (US)

(73) Assignee: QUALCOMM Incorporated

( * ) Notice: Subject to any disclaimer, the term of this patent is extended or adjusted under 35 U.S.C. 154(b) by 1256 days.

(21) Appl. No.: 11/478,258

(22) Filed: Jun. 28, 2006

(65) Prior Publication Data

US 2007/0178875 A1 Aug. 2, 2007

Related U.S. Application Data

(60) Provisional application No. 60/695,227, filed on Jun. 28, 2005.

(51) Int. Cl.
*H04B 1/16* (2006.01)
(52) U.S. Cl. ............... 455/343.2; 455/343.4; 455/127.5; 455/458
(58) Field of Classification Search ............... 455/343.2, 455/343.3, 343.4, 574, 127.5, 127.1, 458
See application file for complete search history.

(56) References Cited

U.S. PATENT DOCUMENTS

| | | | |
|---|---|---|---|
| 5,392,287 A | 2/1995 | Tiedemann | |
| 5,404,355 A * | 4/1995 | Raith | 370/311 |
| 5,491,837 A * | 2/1996 | Haartsen | 455/62 |
| 5,870,673 A * | 2/1999 | Haartsen | 455/426.1 |
| 5,910,944 A | 6/1999 | Callicotte | |
| 5,991,279 A * | 11/1999 | Haugli et al. | 370/311 |
| 5,991,600 A * | 11/1999 | Anderson et al. | 340/7.34 |
| 5,991,635 A * | 11/1999 | Dent et al. | 455/517 |
| 6,018,661 A * | 1/2000 | Raith et al. | 455/437 |
| 6,029,061 A | 2/2000 | Kohlschmidt | |
| 6,058,289 A | 5/2000 | Gardner | |
| 6,101,173 A | 8/2000 | Bayley | |
| 6,208,668 B1 | 3/2001 | Dorenbosch | |
| 6,236,674 B1 * | 5/2001 | Morelli et al. | 375/219 |
| 6,330,234 B1 | 12/2001 | Tomasi | |
| 6,332,086 B2 * | 12/2001 | Avis | 455/574 |
| 6,333,939 B1 | 12/2001 | Butler | |
| 6,374,169 B1 * | 4/2002 | Demay et al. | 701/50 |
| 6,445,707 B1 * | 9/2002 | Iuoras et al. | 370/395.43 |
| 6,453,181 B1 | 9/2002 | Challa | |
| 6,564,046 B1 | 5/2003 | Chateau | |
| 6,590,886 B1 | 7/2003 | Easton | |
| 6,606,490 B1 | 8/2003 | Rainish | |
| 6,639,907 B2 | 10/2003 | Neufeld et al. | |
| 6,650,912 B2 | 11/2003 | Chen | |
| 6,735,454 B1 | 5/2004 | Yu | |
| 6,788,924 B1 * | 9/2004 | Knutson et al. | 455/265 |
| 6,816,736 B2 | 11/2004 | Laroia | |
| 6,873,215 B2 | 3/2005 | Devries | |
| 6,952,571 B1 * | 10/2005 | Garrabrant et al. | 455/226.2 |
| 7,321,788 B2 * | 1/2008 | Addy et al. | 455/574 |
| 7,522,685 B2 * | 4/2009 | Zakrewski | 375/354 |
| 2001/0015963 A1 | 8/2001 | Tuomainen | |
| 2004/0047333 A1 | 3/2004 | Han | |
| 2005/0153751 A1 | 7/2005 | Bultan | |
| 2005/0208966 A1 | 9/2005 | David | |
| 2005/0277429 A1 | 12/2005 | Laroia | |

\* cited by examiner

*Primary Examiner* — Pablo Tran
(74) *Attorney, Agent, or Firm* — Kristine U. Ekwueme

(57) ABSTRACT

Embodiments include methods of activity control in which a time of initiation of an active period of a discontinuous reception (DRX) cycle is based on a value calculated with respect to a wireless signal received during an active period of a previous DRX cycle.

44 Claims, 20 Drawing Sheets

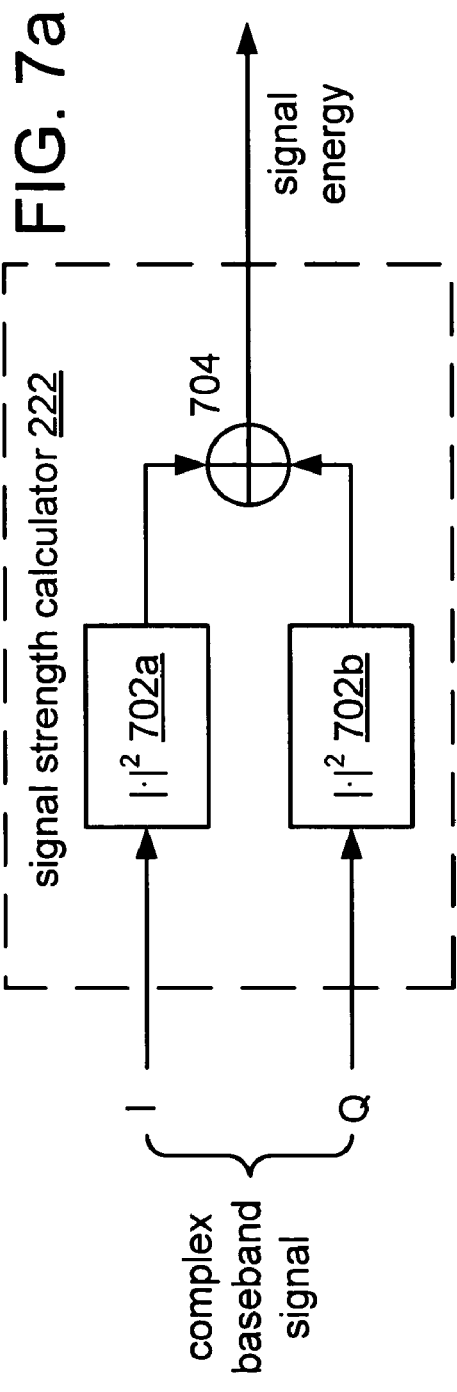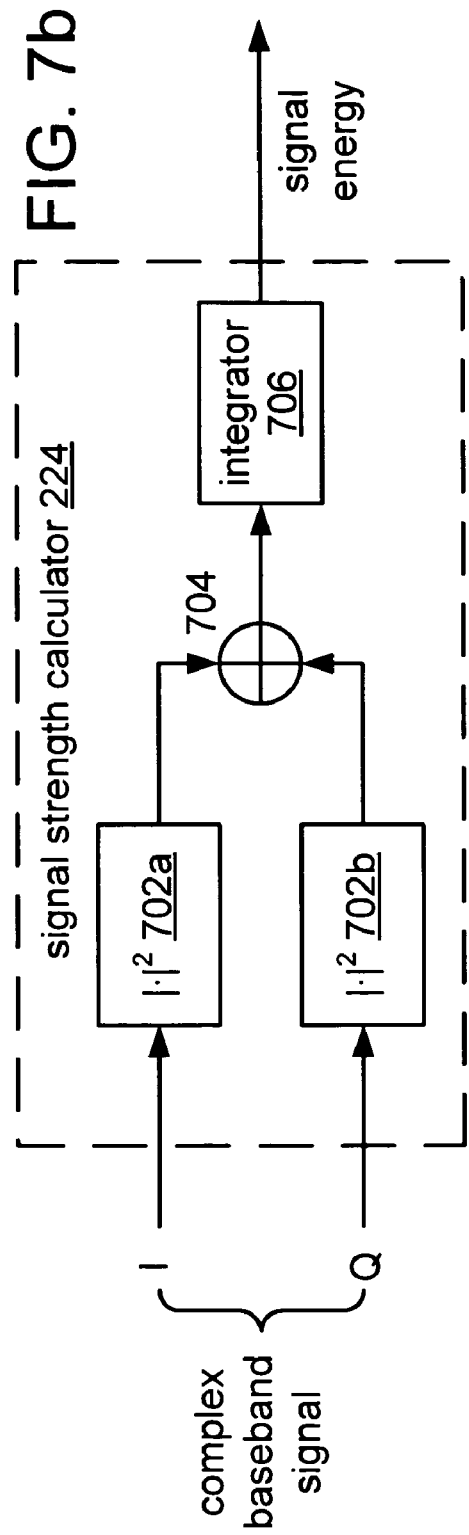

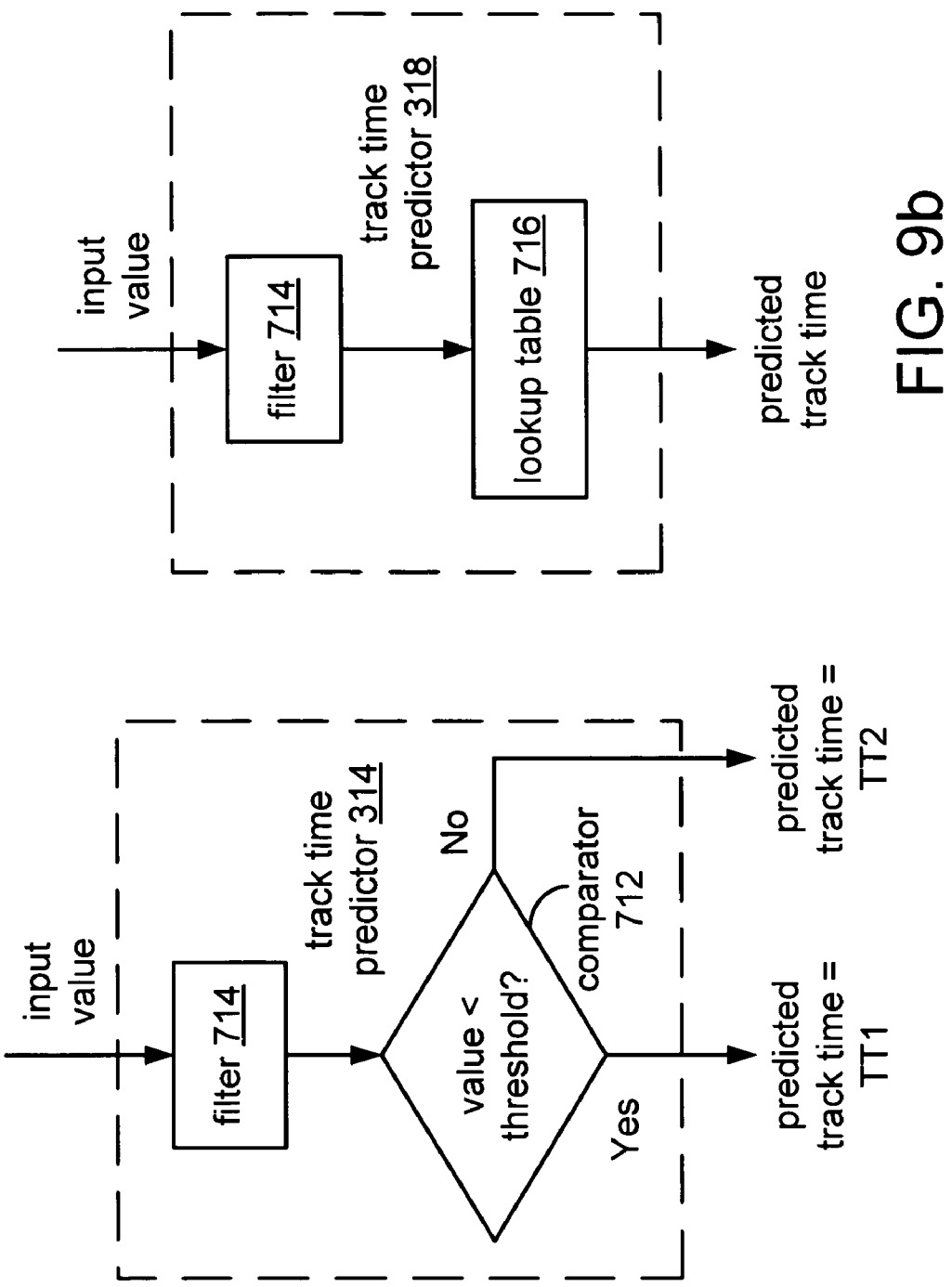

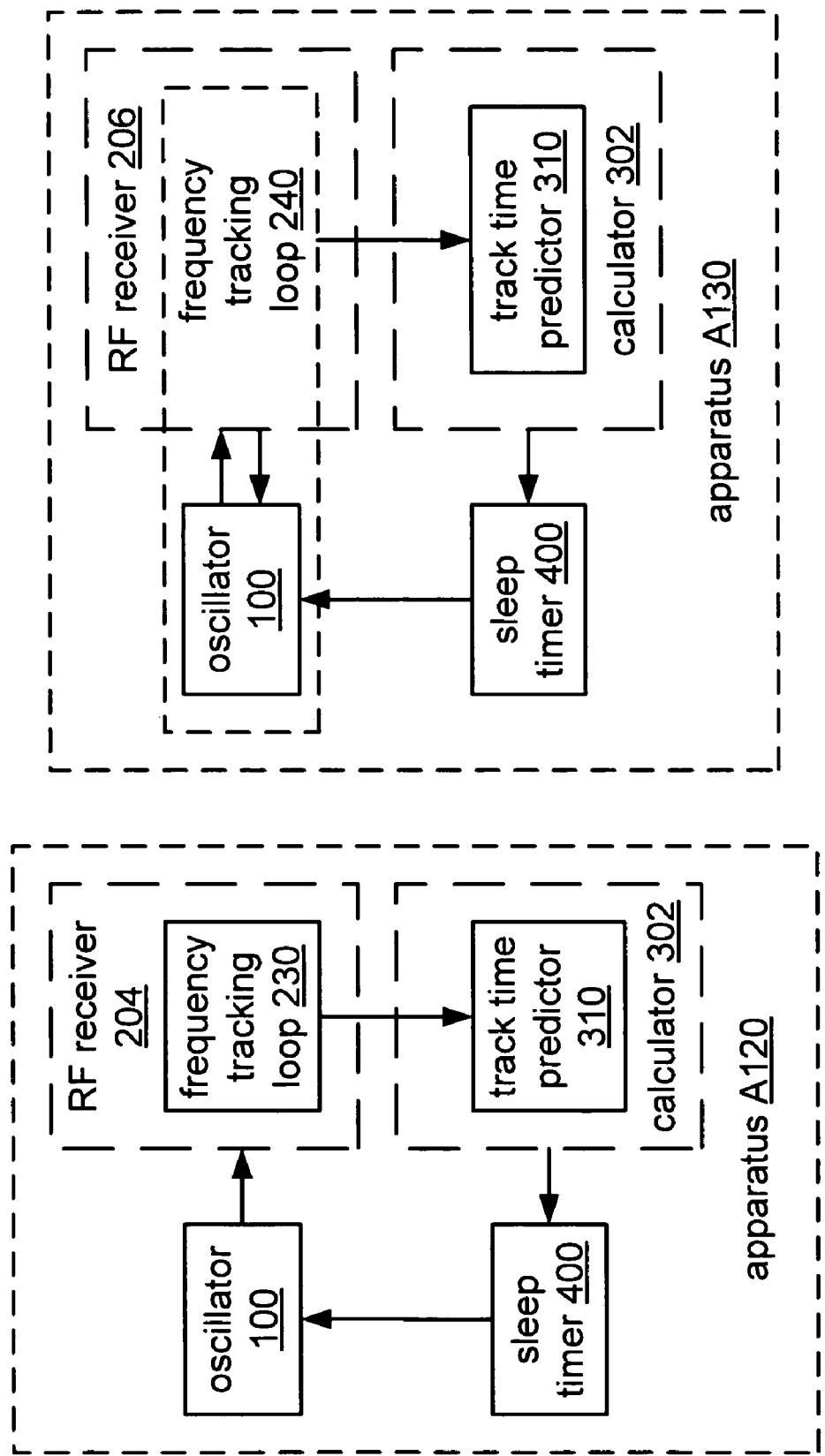

SYSTEMS, METHODS, AND APPARATUS FOR ACTIVITY CONTROL IN A WIRELESS COMMUNICATIONS DEVICE

RELATED APPLICATIONS

This application claims benefit of U.S. Provisional Pat. App. No. 60/695,227, entitled "SYSTEMS, METHODS, AND APPARATUS FOR ACTIVITY CONTROL IN A WIRELESS COMMUNICATIONS DEVICE," filed Jun. 28, 2005.

FIELD OF THE INVENTION

This invention relates to wireless communications.

BACKGROUND

Advances in various technologies have enabled a proliferation of portable devices for wireless communications. Examples of portable wireless communications devices (WCDs) include portable devices such as cellular telephones, wireless modems, pagers, personal e-mail devices (such as a Blackberry™), and personal digital assistants (PDAs). Such a device may be configured to provide voice and/or data services via communication with a network, such as a network for cellular telephony and/or packet data services or a wireless local-area network (WLAN) or personal-area network (WPAN), according to technologies and standards such as one or more of the following: code-division multiple access (CDMA), orthogonal frequency-division modulation (OFDM), a third-generation (3G) system for cellular communications, cdma2000, wideband CDMA (WCDMA), Global System for Mobile Communications (GSM), IS-95, current and future IEEE 802.XX standards, Bluetooth™, and ultra-wideband (UWB).

Some portable WCDs are configured to be self-contained and carry their own power source. Others are configured to provide wireless connectivity to and/or to obtain power from another portable device, such as a cellular telephone or other wireless modem configured to connect to a laptop or other portable computer via a PCMCIA slot or USB port. The description herein assumes that the portable power source is a battery (typically a rechargeable battery), but another power source such as supercapacitor and/or a fuel cell may also be used, possibly augmented by one or more solar cells.

It is desirable to minimize power consumption of a WCD so that the time between battery recharges may be maximized. It may also be desirable for the WCD to consume some power, even when the user is not actively using the device, such that the network may alert the WCD to become fully active when it receives notification of an incoming call directed to the device. It is desirable to minimize the amount of power that the WCD needs to consume in order to maintain this degree of connection to the network.

To reduce the power consumed by a WCD when the device is not actively engaged in communication with another terminal, a wireless network may be configured to page the WCD during predefined discrete intervals using a slotted paging channel. In a WCDMA system or Universal Mobile Telephone System (UMTS), for example, these discrete intervals occur during "paging occasions." A WCDMA network is typically configured to transmit a paging indication channel (PICH) that contains 10-millisecond frames, each frame having 288 bits. The identification number of the WCD (also called "user equipment" or UE in WCDMA) determines which bits of certain PICH frames correspond to, and should be monitored by, that WCD. This identification number, also called an International Mobile Station Identifier (IMSI), is encoded onto the WCD's Subscriber Identity Module (SIM) card. The state of the PICH bits corresponding to the WCD indicate whether the device is being paged (for example, bits encoded as low values (zeroes) may indicate no page, while bits encoded as high values (ones) may indicate that the WCD is being paged). In some systems, the information received during the paging interval allows the WCD to respond to the page, while in other systems, the information received during the paging interval may indicate simply that such information is now available (e.g., on another channel). Other 3G systems use similar paging schemes (e.g., the quick paging channel (QPCH) of a cdma2000 network).

One option would be to keep the WCD awake all the time, and to demodulate all bits of the PICH. However, such an option would severely limit battery life. Thus it is desirable to cycle the WCD between a sleep period, during which various circuitry is powered down to conserve power, and an active period, during which the assigned paging interval is monitored (e.g., the assigned paging indicator bits are received and demodulated). Such a cycle is called a discontinuous reception (DRX) cycle.

One hardware block that is usually powered down during the sleep period is a master oscillator which supplies a source signal (typically of high frequency) for various other clocks in the WCD. The master oscillator may be implemented as a temperature-compensated crystal oscillator (TCXO). Other blocks that are usually powered down during the sleep period include RF circuitry and clocks for driving digital logic (for example, CMOS logic consumes very little power when it is not clocked).

A WCD operating according to a DRX cycle usually has a sleep timer configured to time the sleep period. The sleep timer typically includes a low-cost crystal oscillator having a much lower power consumption, frequency, and accuracy than the master oscillator. It may be expected that upon activation, timing errors will arise due to inaccuracy of the sleep timer. Timing errors may be accentuated in a case where the WCD executes a searching and/or synchronization algorithm at a suboptimal rate (for example, to conserve power).

A WCD may also incur frequency errors, which may arise in a variety of ways. For example, the master oscillator of a WCD is also imperfect, and although its frequency is typically calibrated by the manufacturer, the frequency may vary due to temperature and/or aging. Additionally, relative movement of the WCD with respect to a fixed portion of the network may result in an apparent frequency shift due to Doppler effects. Frequency errors may also lead to timing errors that complicate the task of maintaining synchronization with the network.

For proper operation of the WCD, it may be desirable to correct or compensate for these errors. Such correction or compensation takes time to execute, which time may be measured by processor cycles. The time occupied by these operations imposes an additional period during which the WCD stays awake and consumes power.

SUMMARY

A method of activity control according to an embodiment includes receiving, during an active period of a first discontinuous reception (DRX) cycle, a wireless signal, and calculating a value based on the received wireless signal. The method includes calculating, based on the calculated value, a starting time for the active period of a second DRX cycle subsequent to the first DRX cycle. In this method, the calculated value indicates at least one among (A) a quality of the received wireless signal and (B) an error of at least one among time and frequency with respect to the received wireless signal.

An apparatus for wireless communications according to an embodiment includes an oscillator configured to produce a frequency reference. The apparatus includes a radio-frequency (RF) receiver arranged to receive the frequency reference, wherein the RF receiver is configured to receive a wireless signal according to the frequency reference. The apparatus includes a sleep timer configured and arranged to activate the oscillator during the active periods of each of a plurality of discontinuous reception (DRX) cycles and a calculator configured to calculate a starting time for the active period of a second one of the plurality of DRX cycles subsequent to the first one. The calculator is configured to calculate the starting time based on a value that indicates at least one among (A) a quality of a wireless signal received by the RF receiver during the active period of a first one of the plurality of DRX cycles and (B) an error of at least one among time and frequency with respect to a wireless signal received by the RF receiver during the active period of the first one of the plurality of DRX cycles.

An apparatus for wireless communications according to another embodiment includes means for receiving a wireless signal during an active period of a first discontinuous reception (DRX) cycle; means for calculating a value based on the received wireless signal; and means for calculating, based on the calculated value, a starting time for the active period of a second DRX cycle subsequent to the first DRX cycle. In this apparatus, the calculated value indicates at least one among (A) a quality of the received wireless signal and (B) an error of at least one among time and frequency with respect to the received wireless signal.

BRIEF DESCRIPTION OF THE DRAWINGS

FIG. 7a shows a block diagram of an implementation 222 of signal strength calculator 220.

FIG. 7b shows a block diagram of an implementation 224 of signal strength calculator 220.

FIG. 9a shows a block diagram of an implementation 314 of track time predictor 310.

FIG. 9b shows a block diagram of an implementation 318 of track time predictor 310.

FIG. 10a shows a block diagram of an implementation A120 of apparatus A100.

FIG. 10b shows a block diagram of an implementation A130 of apparatus A100.

DETAILED DESCRIPTION

During the active period of a DRX cycle, it may be desirable to perform adaptive correction or compensation of errors of time and/or frequency to improve power saving. For example, it may be desirable to adapt such correction or compensation according to diverse signal conditions.

Embodiments include systems, apparatus, and methods configured to predict, before entering a sleep period of a DRX cycle, a track time during a subsequent active period of a DRX cycle. Such an embodiment may predict the time needed to track frequency and/or timing in a future active period based on a measure of pilot signal strength, SNR, frequency error corrected, and/or timing error corrected during the current active period and/or one or more previous active periods.

In a typical transition of a WCD from an active period of a DRX cycle to a sleep period, the radio-frequency (or "RF") analog circuitry is powered down, as well as some of the digital circuitry, and a sleep timer is programmed to wake up the WCD before the next assigned paging interval is expected to occur. At the desired starting time, an activation signal from the sleep timer initiates the wake-up, the digital circuitry is re-activated, and the RF chips are turned on. After some time, the WCD becomes able to receive a paging signal during the paging interval (e.g., to receive the paging indicator bits).

If the bits indicate that the WCD has been paged, then the WCD may remain in an awake mode to demodulate further paging information. Otherwise, the WCD may initiate a sleep period, programming a starting time for the next active period by storing a countdown or count-up value corresponding to the desired interval into a sleep timer. While it is desirable to reduce the time that the WCD needs to stay awake (for example, to save power while the WCD is in an idle state), the active period should account for the time that the WCD will need to become able to reliably receive the paging signal.

Figure 1:
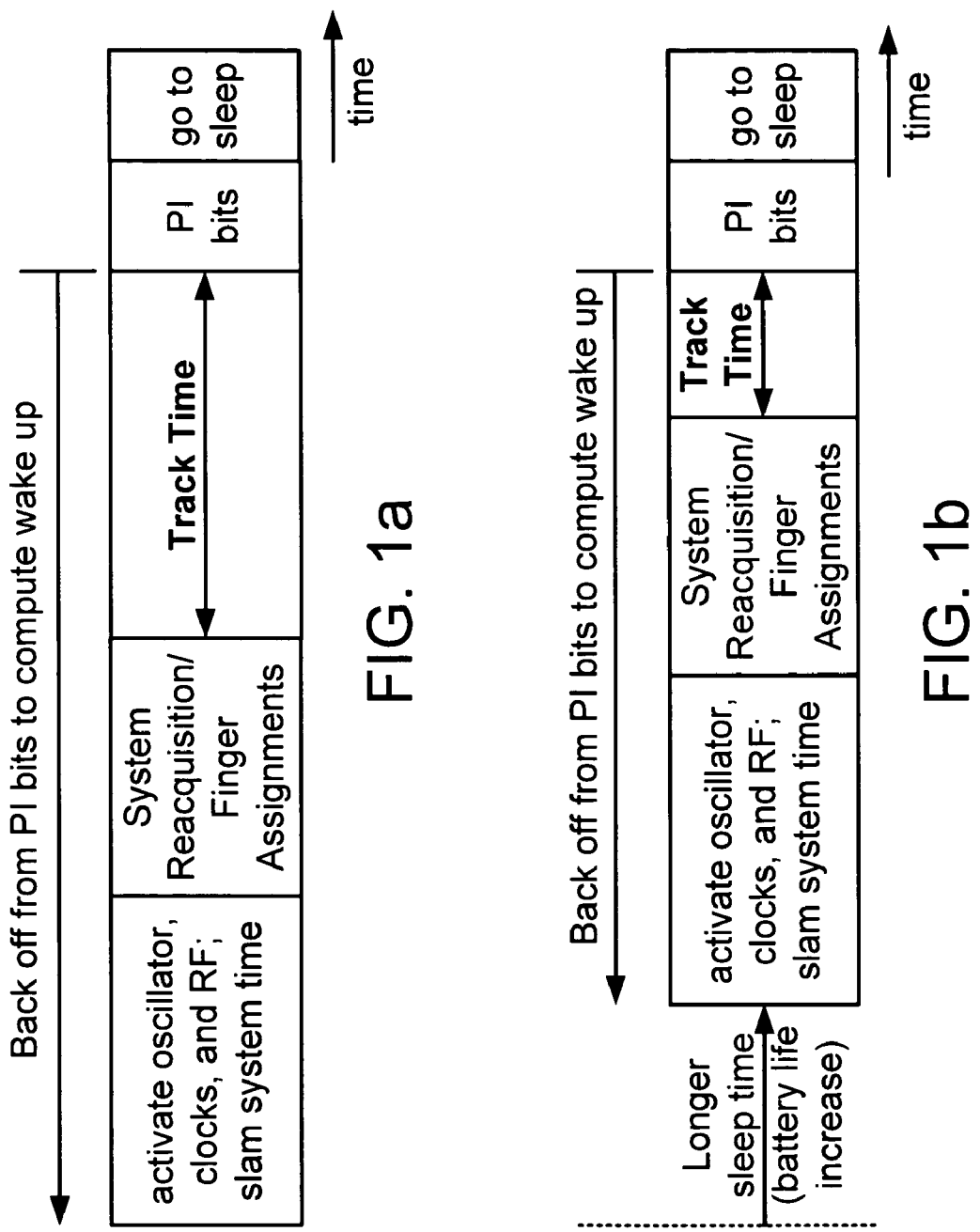
FIG. 1a shows a typical example of a schedule for the active period of a DRX cycle.
FIG. 1b shows an example of an optimized schedule according to an embodiment.

FIG. 1a shows a typical example of a schedule for the active period of a DRX cycle. A first task of this schedule includes activating various elements of the WCD, such as a main oscillator, clocks, and RF circuitry. The first task of this example also includes "slamming" the local estimate of a system timing parameter (for example, system time plus system frame number), where the term "slam" means to reset the timing in synchronism with some reference event, as described in U.S. Pat. No. 6,639,907 (Neufeld et al.) and U.S. Publ. Pat. Appl. No. 2004/0047333 (Han et al.)).

Figure 2:
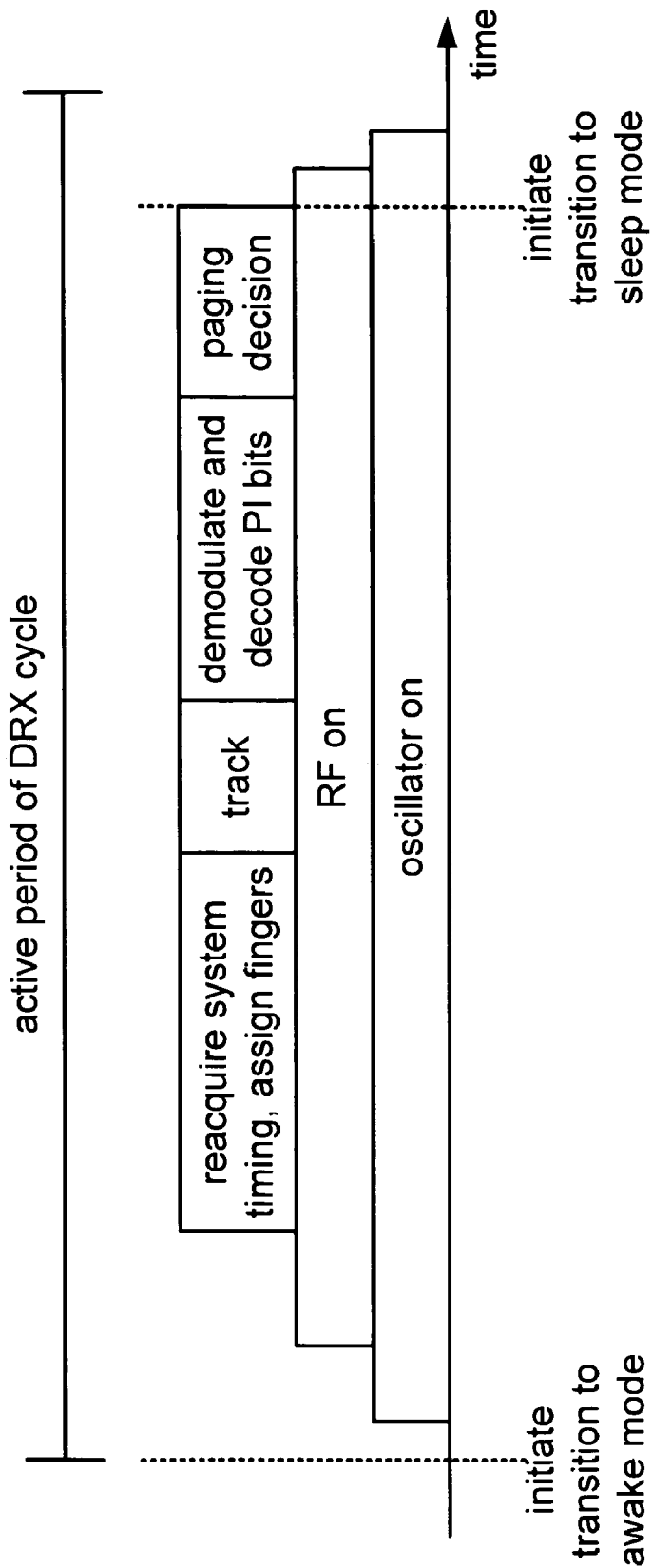
FIG. 2 shows a timeline for an active period of a DRX cycle.

FIG. 2 shows another example of a timeline for the active period of a DRX cycle. This period starts, for example, when the sleep timer runs out. As shown in this figure, typically the first event performed during the active period is to activate the oscillator. After a brief delay to allow the oscillator to stabilize, one or more signal generators are activated. These signal generators, which may include frequency and/or clock synthesizers such as phase-locked loops and M/N:D counters, are arranged to generate signals from the frequency reference such as local oscillator signals for downconverting RF signals and/or clock signals for driving digital logic circuits.

After a brief period to allow the RF circuitry to stabilize, the next task in the schedules as shown in FIGS. 1a and 2 is to resynchronize the WCD's internal time clock to the timing of the network. This task, also called reacquiring the system time, is commonly performed with reference to a pilot channel or other synchronization signal transmitted by the network. In a WCDMA system, for example, a base station transmits a common pilot channel, or CPICH, which allows a WCD to synchronize its operations with a network clock. Once the RF circuitry becomes able to receive, the WCD searches the pilot channel to determine the timing of the WCD relative to the network. For example, such a procedure may be used to determine any drift that has occurred since the WCD went to sleep.

In a digital system, searching the pilot channel typically includes a set of correlation operations to identify the point (or "code phase") at which a reference code sequence has the highest degree of correlation with the received signal. Rather than performing the correlations across all possible code phases, it may be desired to limit the reacquisition search to a relatively small window in code phase space, based on approximate knowledge of the time lapse and the error of the sleep timer. The reacquisition operation typically corrects for error of the sleep timer oscillator.

A WCD configured to communicate with a CDMA network usually includes a rake receiver having a searcher and a set of fingers. In such a device, the searcher typically performs the reacquisition task. Once this coarse estimate of system time has been reestablished, the fingers of the rake receiver are assigned to various multipaths of the received signal for demodulation of the paging signal. At this point, however, two sets of uncertainties may exist, and the receiver may need some time to resolve both of them before reliable demodulation can be performed.

One set of uncertainties relates to frequency, in that the frequency of the signal relative to a local oscillator signal based on the master oscillator may not be known with sufficient accuracy. Such error may be due to uncompensated oscillator error and/or to Doppler effects. The other set of uncertainties relates to timing. For example, the initial estimate of system time may not be sufficiently accurate to support reliable demodulation. Although the searcher communicates general timing information to the fingers, the accuracy of the searcher may not be sufficient to support reliable demodulation. In one example, the searcher reports timing information at an accuracy of chip×2 (that is, twice the rate of the reference code), while reliable demodulation by the fingers requires an accuracy closer to chip×8 (that is, eight times the rate of the reference code).

Various techniques may be used for estimating and recovering from frequency and timing errors. Most of these techniques for tracking frequency and time use a known synchronization signal, such as a pilot signal, that is transmitted by an element of the network such as a base station. The WCD may be configured to estimate and correct frequency and timing errors according to this synchronization signal. Frequency and code phase are typically tracked separately, although it is possible that errors in both are corrected with reference to the same pilot signal.

It is desirable for the WCD to be ready to demodulate and decode the paging signal when it arrives. Thus it may be desirable to schedule the initiation of the active period to allow time for activities such as frequency and time tracking to complete before the paging interval is expected to begin. For example, it may be desirable to schedule the initiation of the active period to allow time for a frequency tracking loop to converge and/or for a time tracking loop to converge before the paging interval begins.

The rate at which a tracking algorithm is able to converge to an appropriate estimate of frequency and/or timing error is typically a function of pilot signal strength and the magnitude of the initial error to be compensated. Under very good channel conditions, the signal-to-noise ratio (SNR) of the pilot signal may be very high, such that a tracking algorithm may converge rapidly to the correct error estimate. Under bad channel conditions, the SNR of the pilot signal may be low, such that a tracking algorithm may converge very slowly to the correct error estimate. Convergence time may also be longer for larger initial errors, while small initial errors may be corrected more quickly. During operation of a WCD, a mixture of good and bad conditions may be encountered.

Algorithms typically used for tracking of frequency and/or timing are designed primarily for use during modes other than an idle (e.g., DRX) mode. For example, it may be desirable for such an algorithm to be configured to support a connection upon a cold start and/or even in very bad conditions. Such algorithms are commonly adopted for idle-mode use without significant change.

In normal operation, when the WCD is awake and continuously demodulating an RF signal (for example, during a call), such convergence of frequency and time errors may occur only during transient phases. In such cases, it may be desired to budget for a worst-case convergence time, as the length of the convergence period would be expected to have only a minimal impact on WCD performance.

During idle mode operation, however, reception is bursty, with active periods straddling the paging intervals, and transient phases of demodulation are much more common. Errors in frequency and/or timing may accumulate while the WCD is asleep, and it may be necessary to track these errors before the WCD is ready to receive a paging signal.

In one simple proposed approach, the convergence time of the tracking algorithms (also called "track time") is budgeted for good channel conditions. This option would allocate a shorter time period for tracking, implying a shorter awake period and a potentially longer per-charge battery life during standby for the WCD. One potential disadvantage is that when channel conditions are bad, frequency and/or timing errors may not be corrected sufficiently, and bad paging performance may result. In a case where a paging miss occurs, the WCD is typically configured to perform a full acquisition of the paging channel, which consumes excessive time and power.

In an alternative simple proposed approach, the time allocated for convergence is budgeted according to poor channel conditions, such as a worst case. Such a configuration may provide for good paging performance even under bad conditions, but the WCD would remain awake for a longer period of time even when channel conditions are good, potentially reducing total per-charge standby time.

Many of the operations scheduled between initiation of the active period and arrival of the paging signal (e.g., the paging indicator bits) are relatively fixed and insensitive to conditions. However, the time required to track the frequency and/or time of the received signal may vary according to such factors as receive conditions, signal quality, and local errors. Typically, tracking algorithms work better when strength of the synchronization signal is high and have reduced performance when signal conditions become poor. Unfortunately, channel conditions and local error during a future active period are unknown before that period begins.

The starting time for the active period may be calculated backwards from the time at which the relevant paging signal (e.g., the assigned paging indicator bits) is expected to arrive, based on the sum of the various tasks to be completed before that moment. In calculating this sum, conservative amounts such as worst-case estimates are typically used so that successful reception of the paging signal (e.g., successful demodulation of the paging indicator bits) may be expected under any condition. For example, a constant period is typically allocated for frequency and time tracking.

Many different kinds of tracking algorithms are known and may be used in combination with the principles disclosed herein. In accordance with those principles, track time may be based on one or more conditions, regardless of the particular method of tracking that is used. Embodiments may be configured to adapt the timeline to any tracking algorithm whose efficiency depends on one or more conditions such as signal strength and/or frequency error.

It may be desirable to dynamically control the track time, or to dynamically optimize the track time, based on a condition. As compared to a configuration in which a fixed estimate based on a worst-case condition is used, such dynamic control may have the advantage of increasing battery life.

FIG. 1b shows an example of an optimized schedule according to an embodiment under good signal and/or Doppler conditions. As compared to the example of FIG. 1a, this schedule shows a significant reduction in track time. In one example of a WCD according to prior technology, a complete active period lasts for fifteen milliseconds, one-third of which is allocated to track time. In one example of a WCD that includes an embodiment as described herein, the duration of the active periods may range from eleven milliseconds (for very bad conditions, where five milliseconds is allocated to track time) to eight milliseconds (for good conditions, where two milliseconds is allocated to track time).

Embodiments include an adaptive approach to planning the sleep timeline. Instead of committing to a fixed time budget for tracking of frequency and timing errors, the budget for a future sleep period is calculated based on a history of estimates observed in one or more previous active periods. Such estimates may include estimates of pilot signal strength (e.g. one or more values of a received signal strength indicator (RSSI) parameter), pilot SNR, frequency error corrected (for example, in Hertz or other units), and/or timing error corrected (for example, in fractions of code phase chips or other units) in one or more previous cycles. These estimates may be used as indications of the quality of present channel conditions and/or to indicate the extent of a current frequency and/or timing error.

Based on these estimates, an expected convergence time for the tracking algorithms or "predicted track time" (e.g., the time expected for one or more tracking algorithms to achieve a convergence to within some respective error bound) may be computed. Such computation may be based on simple thresholds or on more complicated lookup tables or functions. The expected convergence time may then be budgeted dynamically in planning for future DRX cycles.

At least some implementations may provide advantages of both simple approaches described above. Under good conditions, a smaller amount of time may be budgeted for tracking, resulting in shorter awake periods and longer standby times. Under bad conditions, a longer period is budgeted for tracking such that paging performance is not compromised. In such manner, the sleep timeline may be tuned adaptively according to a prediction of the current conditions.

At least some embodiments may be applied to address the problem of the impact of a need for a tracking period for compensating timing and/or frequency errors on WCD power consumption. Such an embodiment may be configured to adaptively tune the tracking period according to the prevailing signal strength. Under good signal conditions, for example, the tracking period may be minimal.

In some systems, paging indications may be transmitted by the network according to DRX cycles having different durations. In a WCDMA system, for example, the paging indicator bits for a particular WCD may be transmitted at a period ranging from 640 milliseconds to 5.12 seconds, with 1.28 and 2.56 seconds being the most common periods. Selection of the duration of a DRX cycle is typically unrelated to channel conditions. For example, it is typically set by the network at the same value for all devices receiving the same service (e.g., all devices for voice communications may have DRX cycles of one duration, and all devices for data communications on the same network may have DRX cycles of another duration). Rather, selection of the duration of a DRX cycle is typically a tradeoff between factors such as battery life (e.g., operating time between battery recharges) on one hand and latency and responsiveness on the other. In a push-to-talk system, for example, it may be desired to use a very short DRX cycle (e.g., in the range of about 50 to 200 milliseconds).

In another example, a different DRX cycle may be used in a case where a data call including the WCD is interrupted. For example, it may be desired to conduct a voice call using the WCD before the data call has ended. In such a case, the WCD may go dormant, entering an awake/sleep mode cycle with a duration of only eighty milliseconds. One of skill in the art will appreciate that as the length of the DRX cycle decreases, the potential advantage of at least some embodiments as described herein may be expected to increase.

Typically, a paging indication corresponding to a particular WCD is transmitted in a very small burst. For such small bursts, it is desirable to limit overhead. In contrast, added overhead may be less troublesome in a case where the paging message is very long. Thus the benefits of at least some embodiments as described herein may be expected to increase as the duration of the paging interval decreases.

Figure 3:
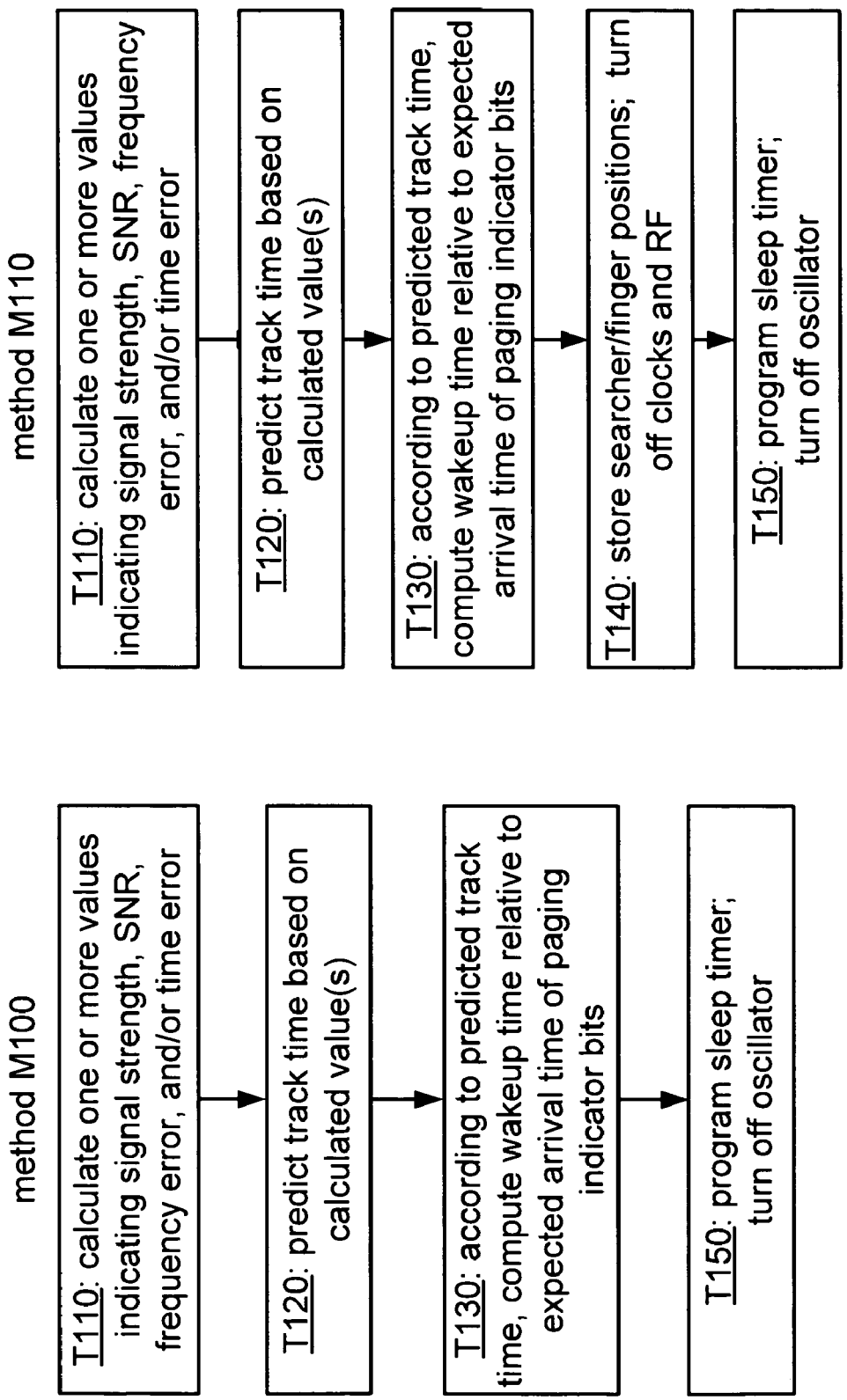
FIG. 3a shows a flowchart of a method M100 according to an embodiment.
FIG. 3b shows a flowchart of an implementation M110 of method M100.

FIG. 3a shows a flowchart of a method M100 according to an embodiment that may be performed in preparation for a sleep period of a DRX cycle. Task T110 calculates one or more values that indicate strength of a received signal, signal-to-noise ratio (SNR) of a received signal, frequency error with respect to a received signal, and/or timing error with respect to a received signal. Based on the calculated value or values, task T120 predicts a track time for the active period of a subsequent DRX cycle. According to the predicted track time, task T130 computes a starting time for the active period of the subsequent DRX cycle. For example, task T130 may be configured to compute the starting time as a countdown or count-up value that indicates a desired sleep interval. In some implementations, task T130 is configured to compute the starting time relative to the time at which a paging interval of the subsequent DRX cycle is expected to occur (e.g., the expected arrival time of a set of paging indicator bits). Task T150 programs a sleep timer and deactivates an oscillator.

FIG. 3b shows a flowchart of an implementation M110 of method M100 that includes a task T140. Task T140 stores local timing parameters, such as searcher and/or finger settings (for example, current code phase positions), and deactivates other elements such as RF circuitry and signal and/or clock generators.

Figure 4:
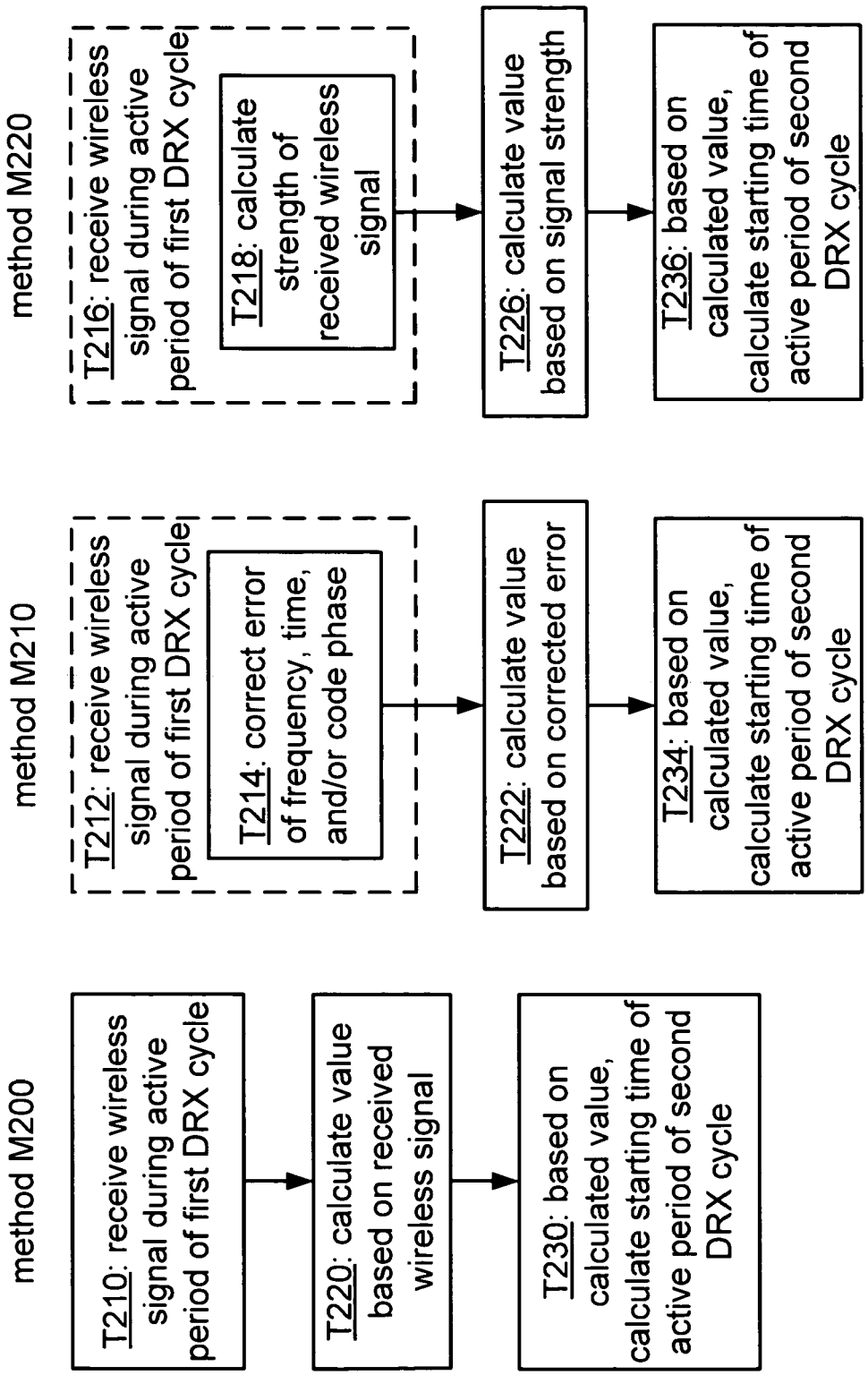
FIG. 4a shows a flowchart of a method M200 according to an embodiment.
FIG. 4b shows a flowchart of an implementation M210 of method M200.
FIG. 4c shows a flowchart of an implementation M220 of method M200.

FIG. 4a shows a flowchart of a method M200 according to another embodiment. Task T210 receives a wireless signal during the active period of a first DRX cycle. Task T220 calculates a value based on the received wireless signal. Based on the calculated value, task T230 calculates a starting time of the active period of a second DRX cycle subsequent to the first DRX cycle.

FIG. 4b shows a flowchart of an implementation M210 of method M200 that includes an implementation T212 of task T210. Task T212 includes a subtask T214 that corrects, based on the received wireless signal, one or more errors of frequency, time, and/or code phase. An implementation T222 of task T220 calculates a value based on at least one of the corrected errors, and based on the calculated value, an implementation T234 of task T230 calculates a starting time of the active period of the second DRX cycle.

FIG. 4c shows a flowchart of an implementation M220 of method M200 that includes an implementation T216 of task T210. Task T216 includes a subtask T218 that calculates a strength of the received wireless signal. An implementation T226 of task T220 calculates a value based on the calculated signal strength, and based on the calculated value, an implementation T236 of task T230 calculates a starting time of the active period of the second DRX cycle.

Figure 5:
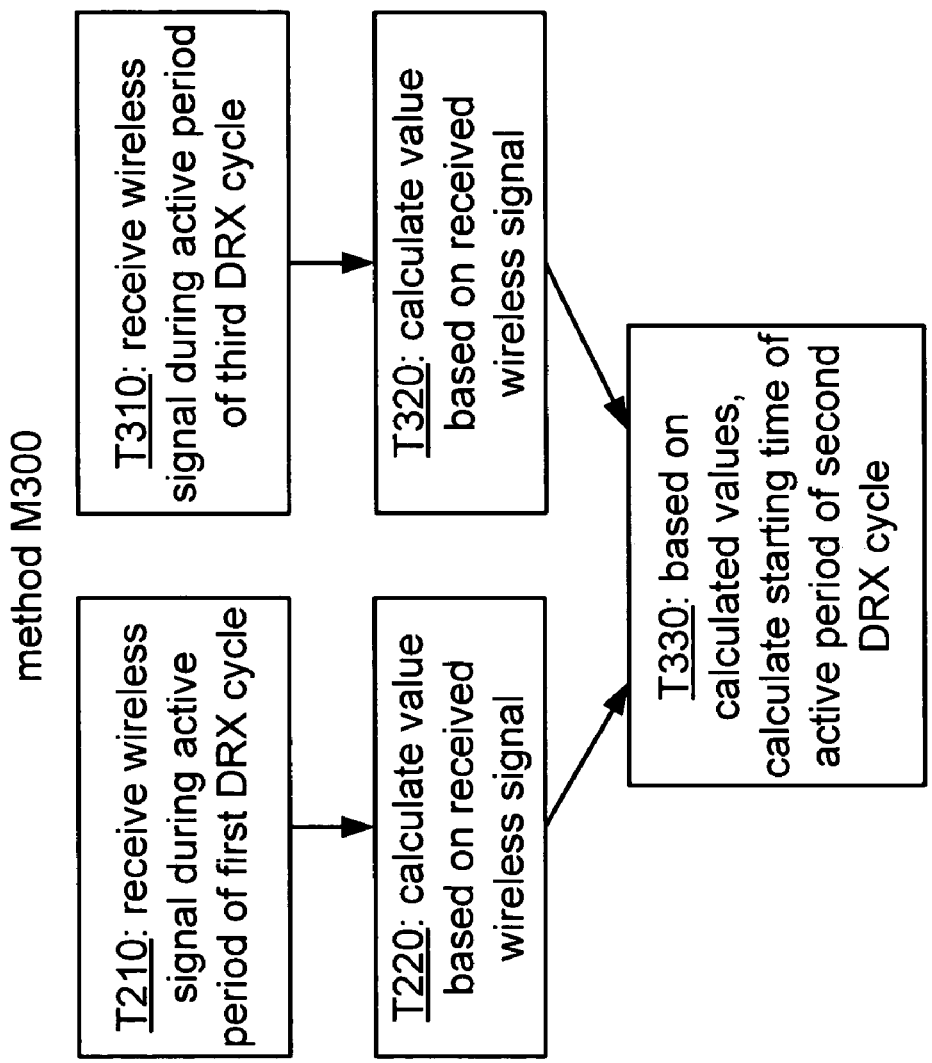
FIG. 5 shows a flowchart of an implementation M300 of method M200.

FIG. 5 shows a flowchart of an implementation M300 of method M200. In method M300, task T310 receives a wireless signal during the active period of a third DRX cycle that is prior to the second DRX cycle. Task T320 calculates a value based on the wireless signal received during the active period of the third DRX cycle, and based on the calculated values from tasks T220 and T320, task T330 calculates a starting time of the active period of the second DRX cycle.

Figure 6A:
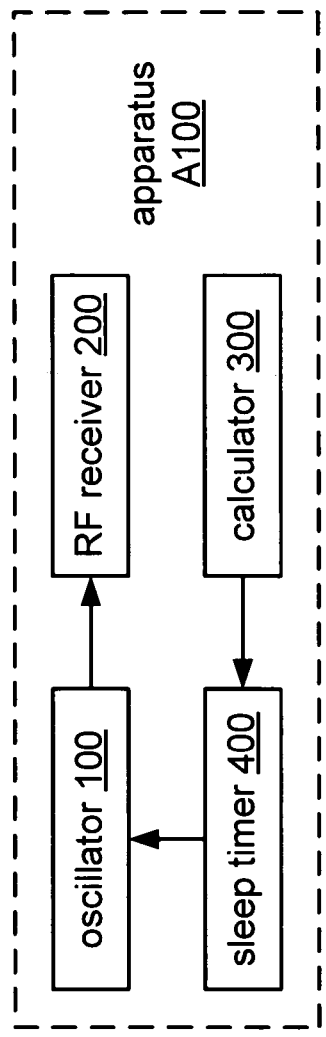
FIG. 6a shows a block diagram of an apparatus A100 according to an embodiment.

FIG. 6a shows a block diagram of an apparatus A100 according to an embodiment. Apparatus A100 includes an oscillator 100 that is configured to provide a frequency reference and an RF receiver 200 that is configured to receive a wireless signal according to the frequency reference. Oscillator 100, which is usually implemented as a temperature-compensated crystal oscillator (TCXO), may have a fixed or variable frequency that is typically in the range of about 10 to 100 MHz and typically has a power dissipation in the range of about one to 20 milliwatts.

RF receiver 200 typically includes elements such as a downconverter configured to convert a received RF signal to baseband according to one or more local oscillator signals; a digitizer such as an analog-to-digital converter that is configured to digitize the baseband signal (which may be complex) according to a sampling clock; one or more signal generators such as frequency and/or clock synthesizers configured to generate signals based on the frequency reference (such as the local oscillator signal(s) and the sampling clock); and a decoder configured to remove one or more spreading, scrambling, or channelization codes from the digital baseband signal. In a WCD configured to receive a CDMA signal, for example, the RF receiver may include a searcher and a set of fingers configured to perform decoding of the digital baseband signal.

Apparatus A100 also includes a sleep timer 400 that is configured and arranged to activate oscillator 300 during the active periods of DRX cycles. Sleep timer 400, which may be implemented as a real-time clock (RTC), typically includes a crystal oscillator having a frequency in the range of about 10 to 100 kHz (e.g., 32.768 kHz) and a power dissipation in the range of about one to 20 microwatts. Sleep timer 400 may also be configured and arranged to activate other elements of apparatus A100 during the active cycles, such as RF receiver 200 and/or one or more signal generators. For example, sleep timer may be configured to activate one or more frequency and/or clock synthesizers that are configured to generate signals based on the frequency reference, possibly after a brief period to allow oscillator 100 to stabilize.

Apparatus A100 also includes a calculator 300 that is arranged to receive at least one value based on a wireless signal received by RF receiver 200 during the active period of a first DRX cycle. This value or values indicates one or more qualities of the wireless signal, such as signal strength or SNR, and/or one or more errors in frequency and/or timing with respect to the wireless signal. Based on the received value(s), calculator 300 is configured to calculate a starting time for the active period of a second DRX cycle subsequent to the first DRX cycle. For example, calculator 300 may be configured to calculate the starting time as a time value indicating a particular moment relative to a reference time of the sleep timer, or as an initial or terminal counter value to be programmed into a counter of the sleep timer. Calculator 300 may be implemented in logic as, for example, one or more arrays of logic elements (such as gates or transistors) and/or one or more sets of instructions executable by one or more arrays of logic elements.

Figure 6B:
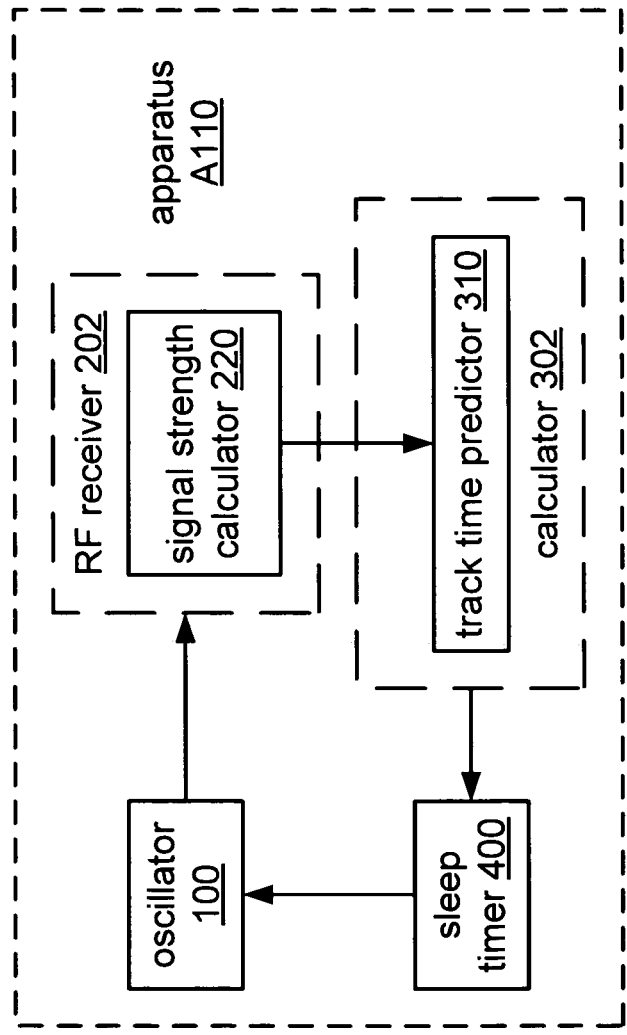
FIG. 6b shows a block diagram of an implementation A110 of apparatus A100.

FIG. 6b shows a block diagram of an implementation A110 of apparatus A100. Apparatus A110 includes an implementation 202 of RF receiver 200 that has a signal strength calculator 220 configured to calculate a strength of the received wireless signal. FIG. 7a shows a block diagram of an implementation 222 of signal strength calculator 220 that is configured to calculate the energy of a complex digital baseband signal (e.g., a pilot signal) as a sum of the squared magnitude of each quadrature component. FIG. 7b shows a block diagram of an implementation 224 of signal strength calculator 220 that is configured to integrate the energy of the signal over some period (e.g., over that portion of the active period during which the wireless signal is received). It may be desirable for signal strength calculator 220 to produce a value that is logarithmically scaled (e.g., in units of dB or dBm).

In one embodiment, a measure of signal strength is obtained before the WCD enters the sleep period, and the time for initiation of the next active period is calculated based on that measure. In one such implementation, if the signal strength is low, then a longer track time is allocated and the initiation is scheduled for an early time; while if the signal strength is high, then a shorter period is allocated for tracking and the initiation is scheduled for later.

Figure 8B:
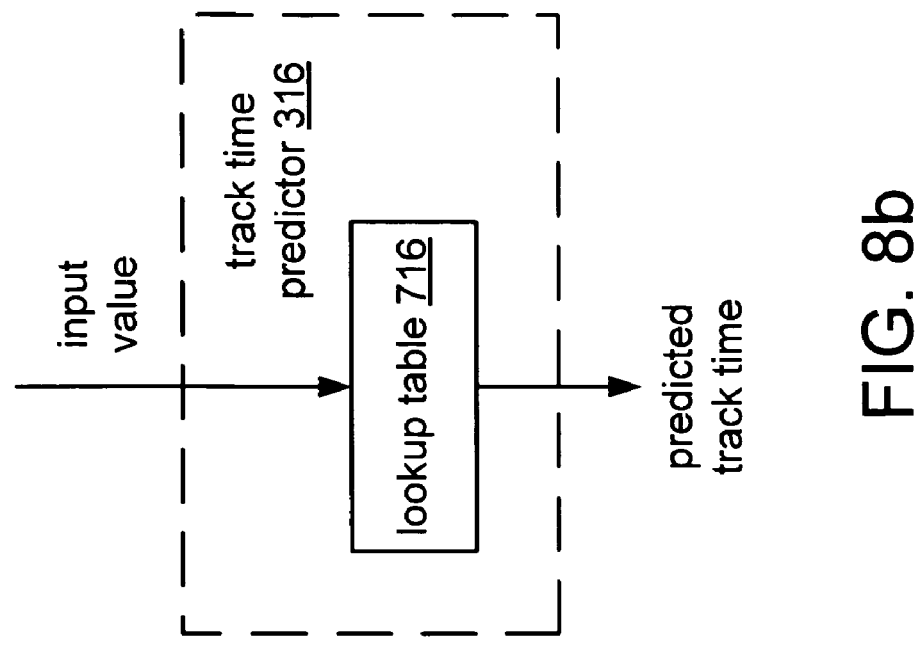
FIG. 8b shows a block diagram of an implementation 316 of track time predictor 310.
Figure 8A:
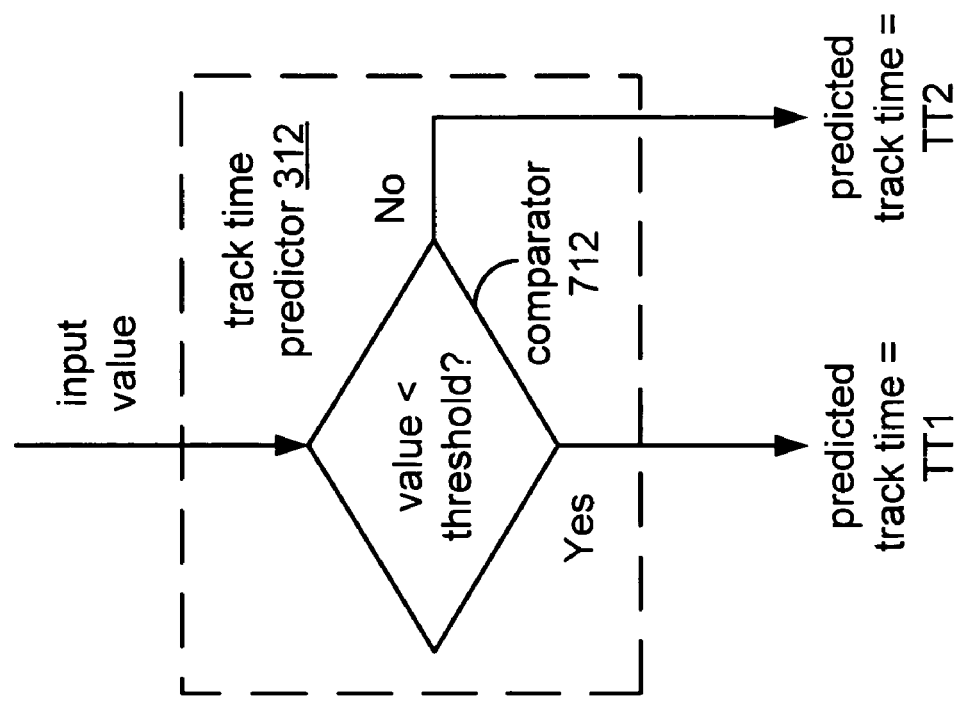
FIG. 8a shows a block diagram of an implementation 312 of track time predictor 310.

Track time predictor 310 may be implemented to select among one or more fixed tracking times based on a result of comparing one or more values, such as measures of signal strength and/or corrected frequency error, to one or more corresponding thresholds. FIG. 8a shows a block diagram of an implementation 312 of track time predictor 310 that includes a comparator 712 configured to compare an input value to a threshold. The threshold may be fixed or may be selected or otherwise calculated according to another measure based on the received wireless signal. For example, the threshold used to evaluate a value of signal strength may be selected according to a measure of corrected frequency error (or vice versa).

It may be desirable to select a predicted track time from among more than two options. Such selection may be performed using a look-up table. FIG. 8b shows a block diagram of an implementation 316 of track time predictor 310 that includes a lookup table 716. Lookup table 716 may be configured to map each of a set of ranges {range_1, range_2, ... , range_n} to a corresponding one of a set of predicted track times {TT1, TT2, ... , TTn}. One of two or more different lookup tables may be selected according to another measure based on the received wireless signal. For example, the lookup table used to map a value of signal strength may be selected according to a measure of corrected frequency error (or vice versa).

Selection of a predicted track time or sleep period duration may be performed according to the most recent measurement or according to a history including more than one recent measurement. FIG. 9a shows a block diagram of an implementation 314 of track time predictor 312 that includes a filter 714, and FIG. 9b shows a block diagram of an implementation 318 of track time predictor 316 that includes filter 714. Filter 714 is configured to provide an output that is a function of more than one of a sequence of input values. For example, filter 714 may be configured to output an average, weighted average, or other smoothed value based on two or more successive input values. These input values may include values calculated during the current active cycle and/or values calculated during different active cycles.

Other implementations of track time predictor 310 may be configured to select or otherwise calculate a duration of the sleep period rather than a predicted track time. One or more values outputted by different instances of track time predictor 310 may be combined to obtain a predicted track time or sleep period duration. A value outputted by track time predictor 310 may also be applied as a factor in calculating a track time or sleep period duration according to a desired relation.

In addition to or in the alternative to signal strength, other conditions or condition indications may also be used in calculating the starting time of the next active cycle. In another embodiment, for example, the starting time is based on the amount of frequency error that was corrected in the previous active cycle. Such frequency error may be expected to occur mainly because of Doppler effects.

FIG. 10a shows a block diagram of an implementation A120 of apparatus A100. Apparatus A120 includes an implementation 204 of RF receiver 200 that has a frequency tracking loop 230.

Figure 11A:
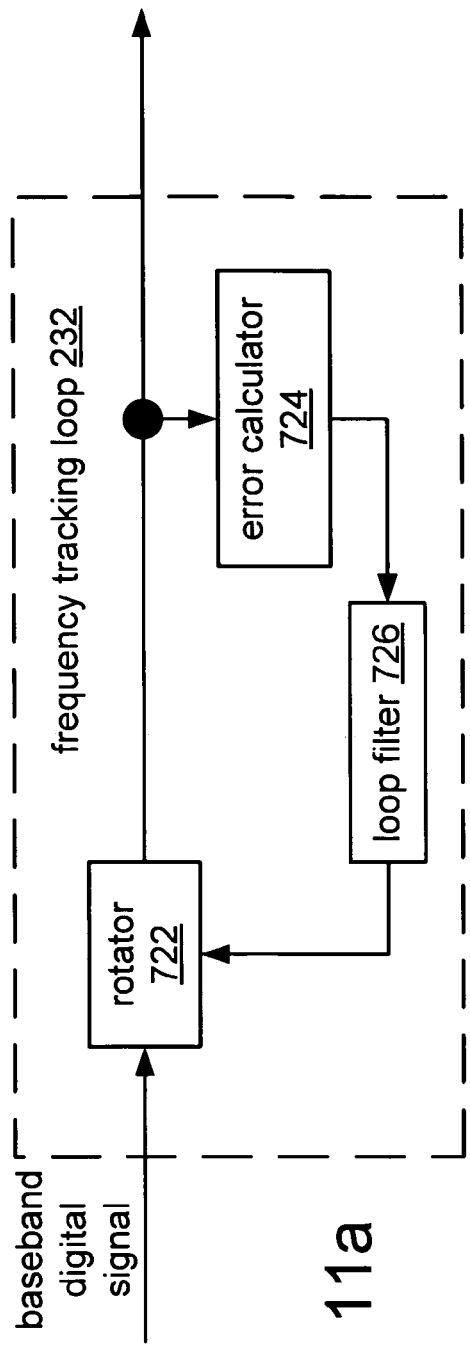
FIG. 11a shows a block diagram of an implementation 232 of frequency tracking loop 230.

FIG. 11a shows a block diagram of an implementation 232 of frequency tracking loop 230 that includes a rotator 722 configured to rotate the phase of a complex signal according to a frequency error of the complex signal, as calculated by error calculator 724 (e.g., a frequency discriminator) and filtered by loop filter 726. Such a loop, which may also include other elements such as fingers, may be used in conjunction with a fixed- or variable-frequency implementation of oscillator 100. Some implementations of RF receiver 204 include more than one such loop (e.g., one for each finger), each configured to rotate the phases of a respective stream of samples, where the various rotated streams are later combined. Loop 232 may be configured to output an indication of the frequency error to track time predictor 310 as the output of error calculator 724 or loop filter 726 (possibly integrated over some period, such as the period over which RF receiver 204 is active).

Figure 11B:
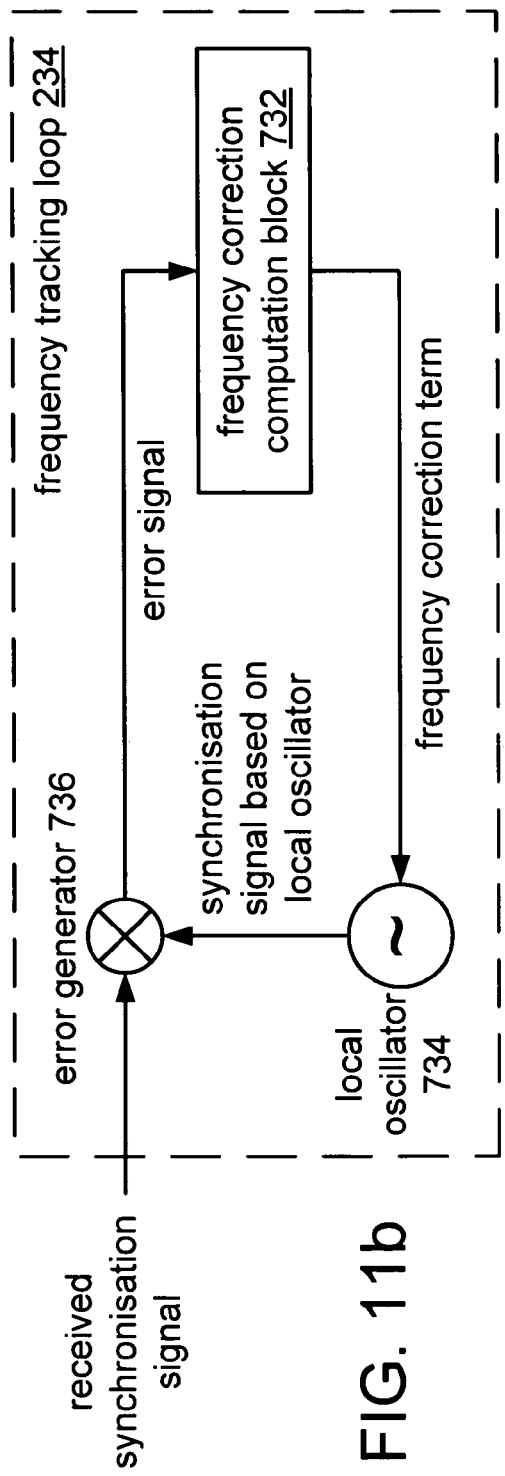
FIG. 11b shows a block diagram of an implementation 234 of frequency tracking loop 230.

FIG. 11b shows a block diagram of an implementation 234 of frequency tracking loop 230 that includes a local oscillator 734. Error generator 736 is configured to generate an error signal as a function of a distance between a received synchronization signal and a synchronization signal that is based on a signal generated by local oscillator 734. Error generator 736 is also arranged to output the error signal to frequency correction computation block 732, which may be implemented as a loop filter. Block 732 produces a frequency correction term that is applied to local oscillator 734. Loop 234 may be configured to output an indication of the frequency error to track time predictor 310 as the output of error generator 736 or block 732 (possibly integrated over some period, such as the period over which RF receiver 204 is active).

FIG. 10b shows a block diagram of an implementation A130 of apparatus A100. Apparatus A130 includes an implementation 206 of RF receiver 200 and a frequency tracking loop 240 that includes oscillator 100 and elements of RF receiver 206.

Figure 12:
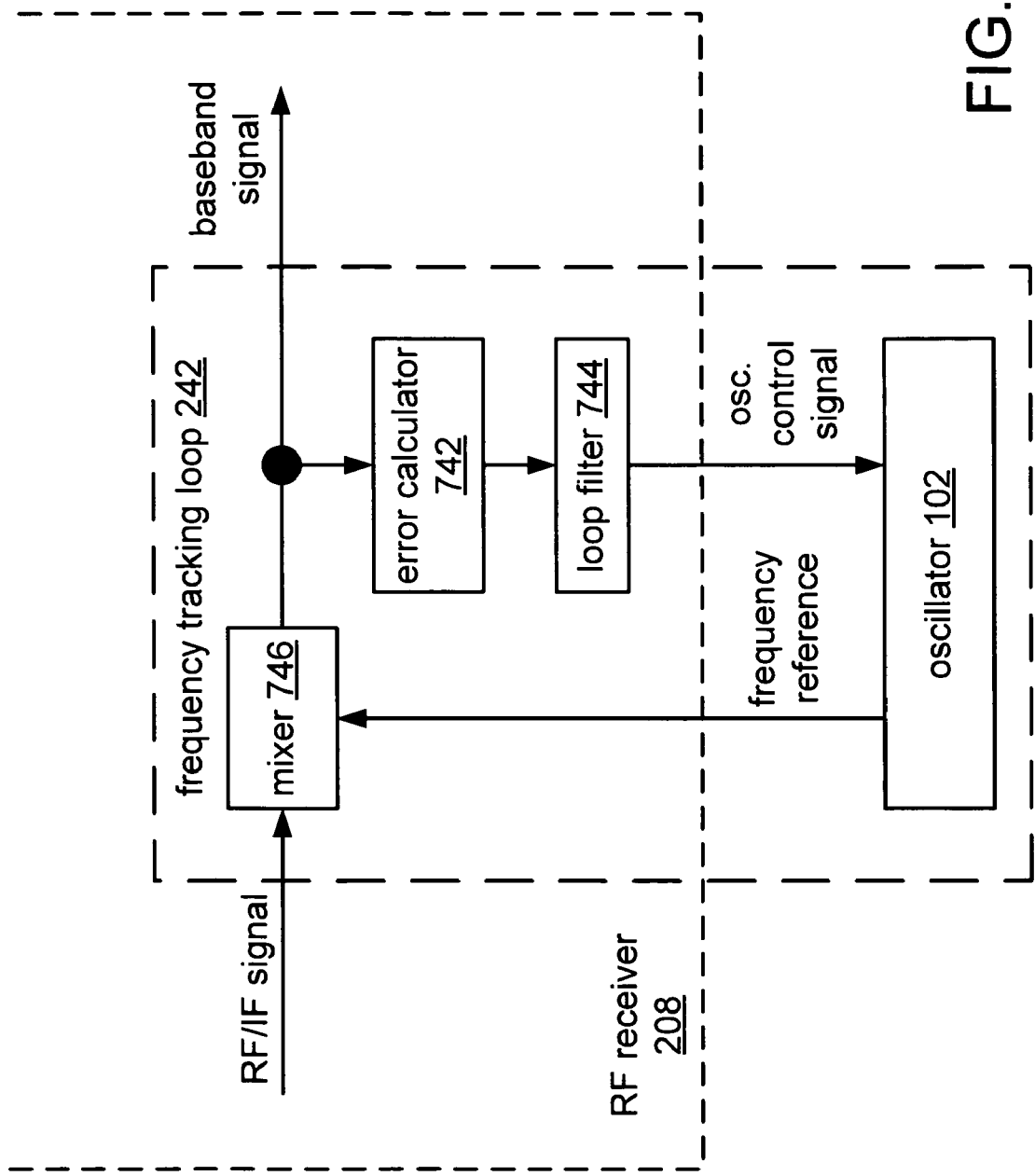
FIG. 12 shows a block diagram of an implementation 242 of frequency tracking loop 240.

FIG. 12 shows a block diagram of an implementation 242 of frequency tracking loop 240. Loop 242 includes mixer 746 of RF receiver 208 that is configured to downconvert an RF or intermediate frequency (IF) signal by applying, as a local oscillator signal, the frequency reference outputted by variable-frequency implementation 102 of oscillator 100. Error calculator 742, which is arranged to produce an error signal based on the downconverted signal, may be configured as a frequency discriminator and is typically arranged to receive a complex digitized baseband signal (e.g., from a digitizer such as an analog-to-digital converter (ADC) which is not shown). Loop filter 744 is configured to filter the error signal to produce an oscillator control signal that adjusts the frequency of variable-frequency oscillator (VFO) 102.

In one example, the frequency of oscillator 102 is variable in steps of between about 5 and 30 Hz (e.g., 7 Hz). In another example, the frequency of VFO 102 has a resolution in the range of about ¼ to about 5 Hertz per least significant bit of the oscillator control signal (Hz/LSB). Oscillator 102 may include a pulse density modulator or other digital-to-analog converter arranged to convert a digital oscillator control signal to an analog control voltage. Loop 242 may be configured to output an indication of the frequency error to track time predictor 310 as the output of error calculator 742 or loop filter 744 (possibly integrated over some period, such as the period over which RF receiver 208 is active).

Figure 13:
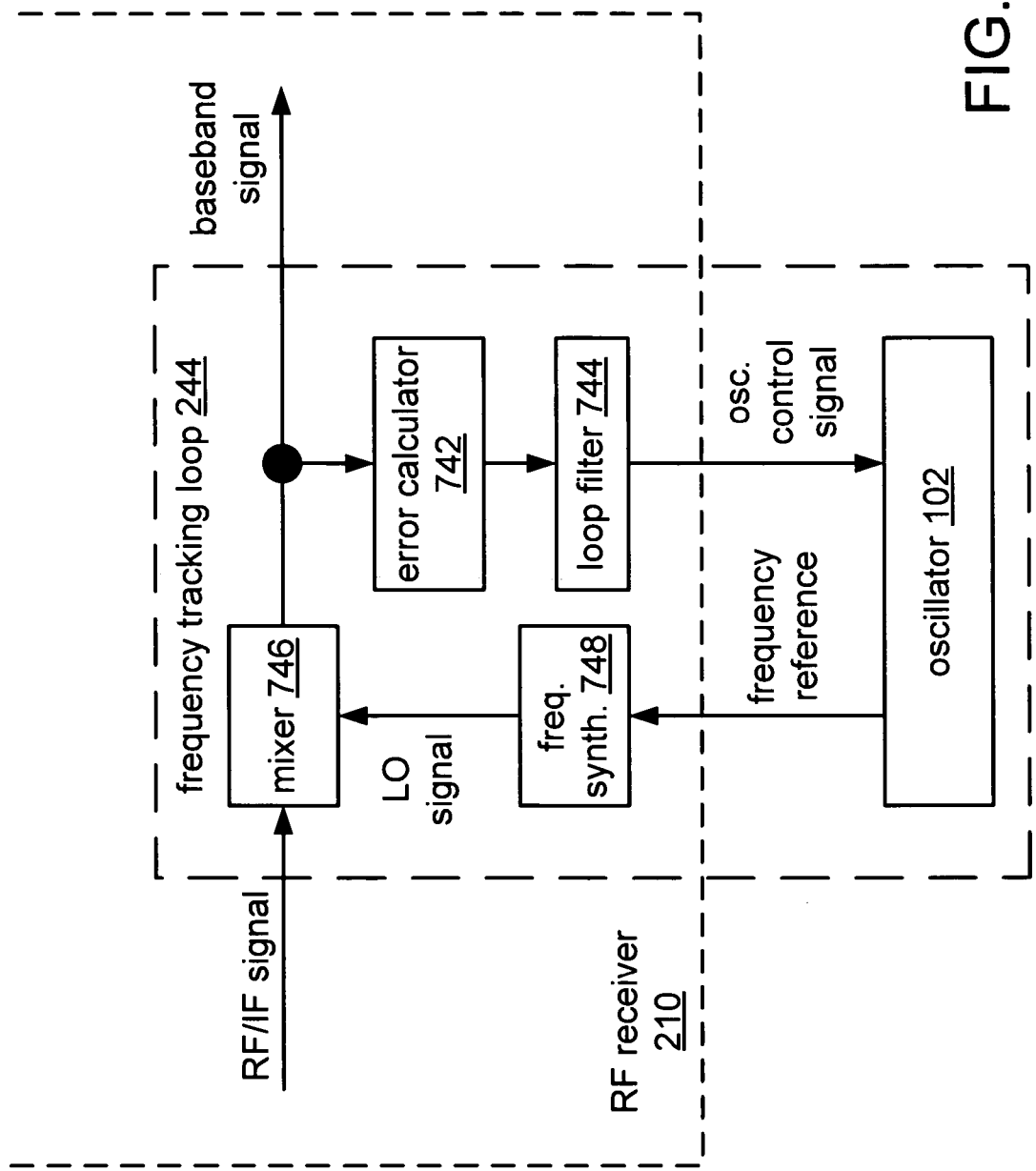
FIG. 13 shows a block diagram of an implementation 244 of frequency tracking loop 240.

FIG. 13 shows a block diagram of an implementation 244 of frequency tracking loop 240. Loop 244 includes a frequency synthesizer 748 (e.g., a phase-locked loop) of RF receiver 210 that is configured to provide a local oscillator signal to mixer 746 that is based on the frequency reference from VFO 102. Loop 244 may be configured to output an indication of the frequency error to track time predictor 310 as the output of error calculator 742 or loop filter 744 (possibly integrated over some period, such as the period over which RF receiver 210 is active).

Figure 14:
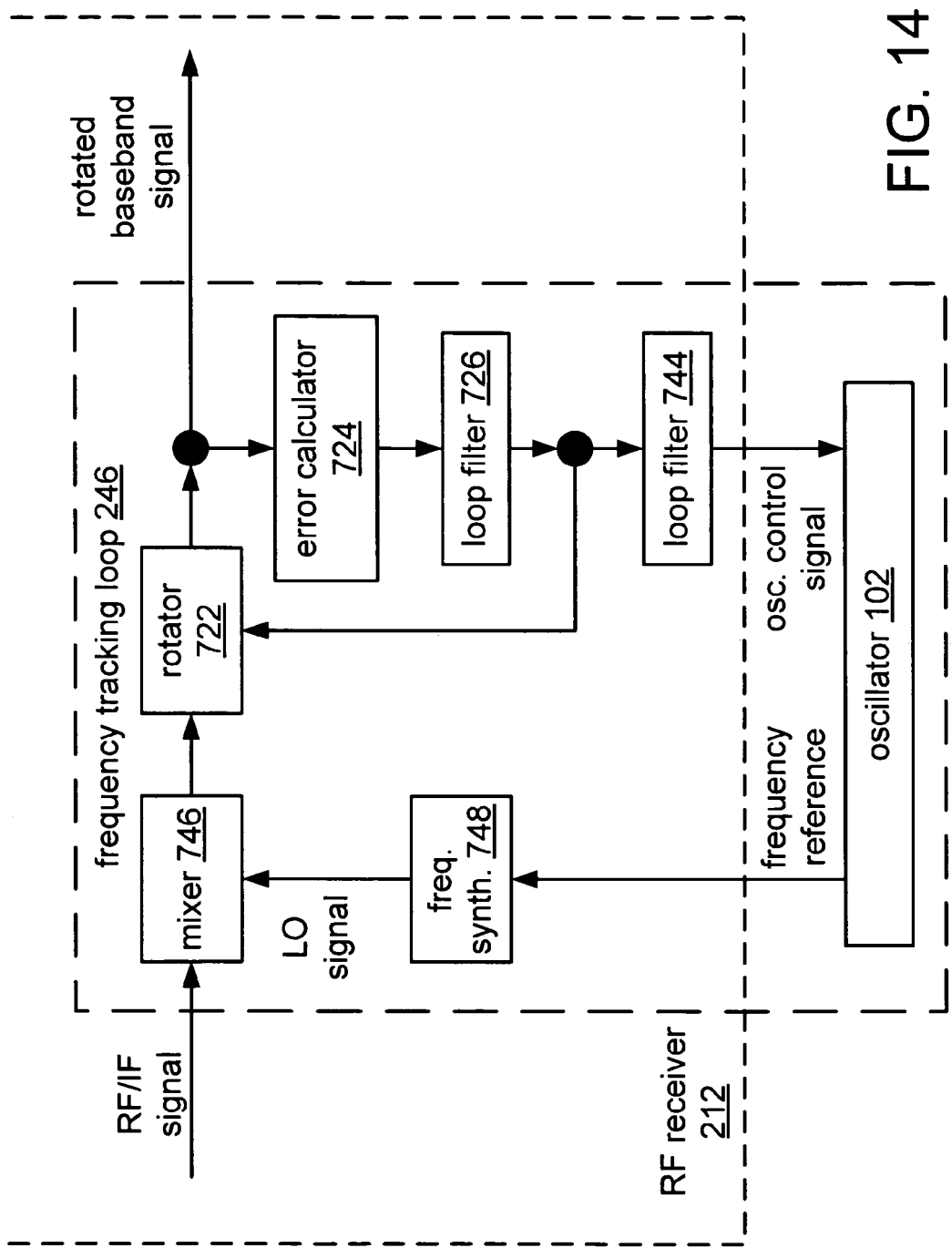
FIG. 14 shows a block diagram of an implementation 246 of frequency tracking loop 240.

FIG. 14 shows a block diagram of an implementation 246 of frequency tracking loop 240 that includes elements of an implementation 212 of RF receiver 210 and has nested rotator and VFO loops. Loop 246 may also be implemented such that the rotator and VFO loops are decoupled. Loop 246 may be configured to output an indication of the frequency error to track time predictor 310 as the output of error calculator 724, loop filter 726, or loop filter 744 (possibly integrated over some period, such as the period over which RF receiver 212 is active).

The starting time calculation may be based on more than one indication of a condition over time. For example, it may be desirable to calculate the starting time based on a history of signal strength and/or frequency correction measures. In some implementations, track time prediction (e.g., thresholding) based on frequency error is combined with track time prediction based on pilot signal strength to calculate the starting time for the active period.

Figure 15:
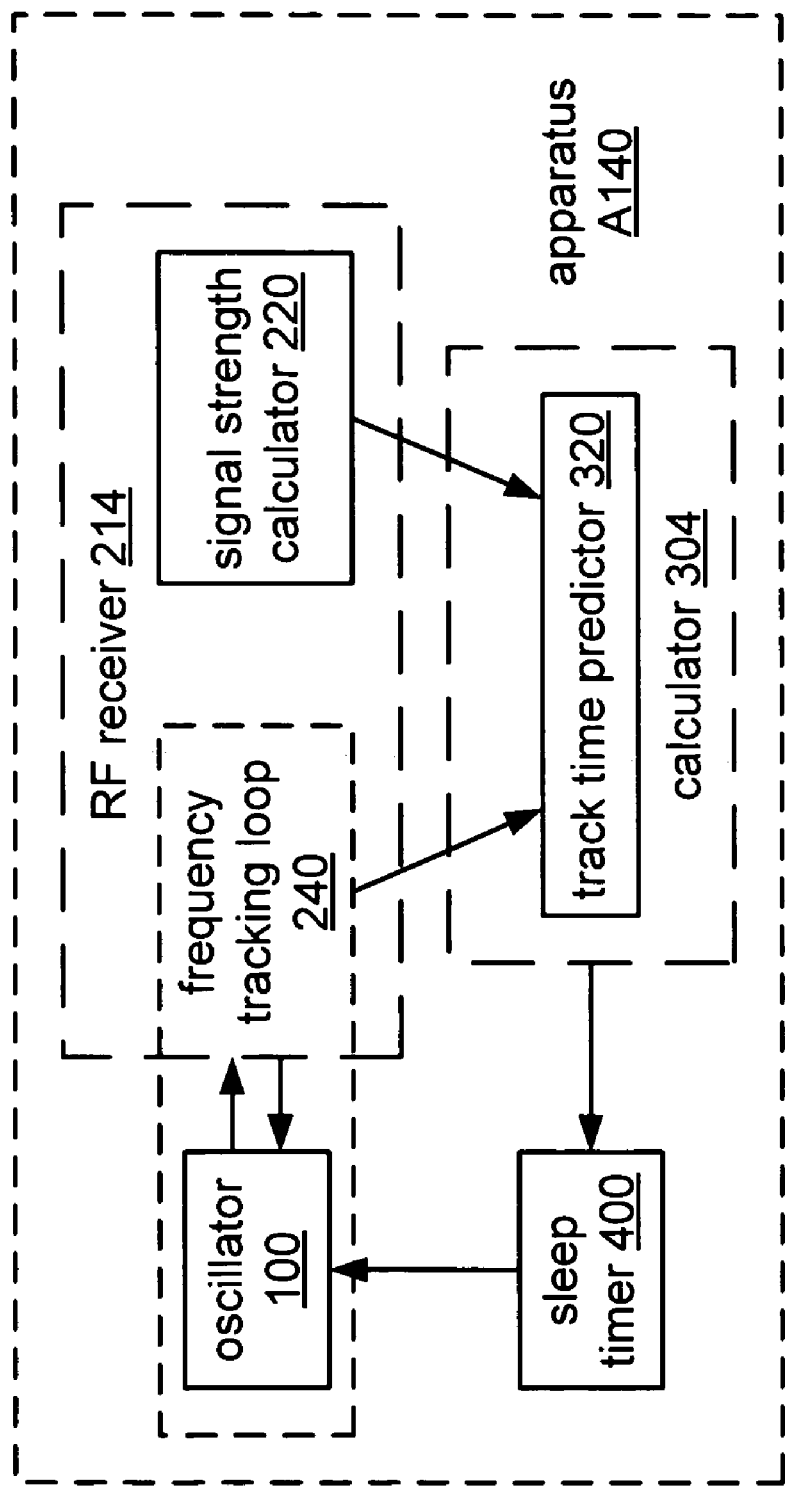
FIG. 15 shows a block diagram of an implementation A140 of apparatus

FIG. 15 shows a block diagram of an implementation A140 of apparatus A100 that includes frequency tracking loop 240 and an implementation 214 of RF receiver 202. Apparatus A140 also includes an implementation 304 of calculator 302 having an implementation 320 of track time predictor 310. Track time predictor 320 is configured to calculate a predicted track time based on one or more values of signal strength from signal strength calculator 220 and corrected frequency error from frequency tracking loop 240.

Figure 16:
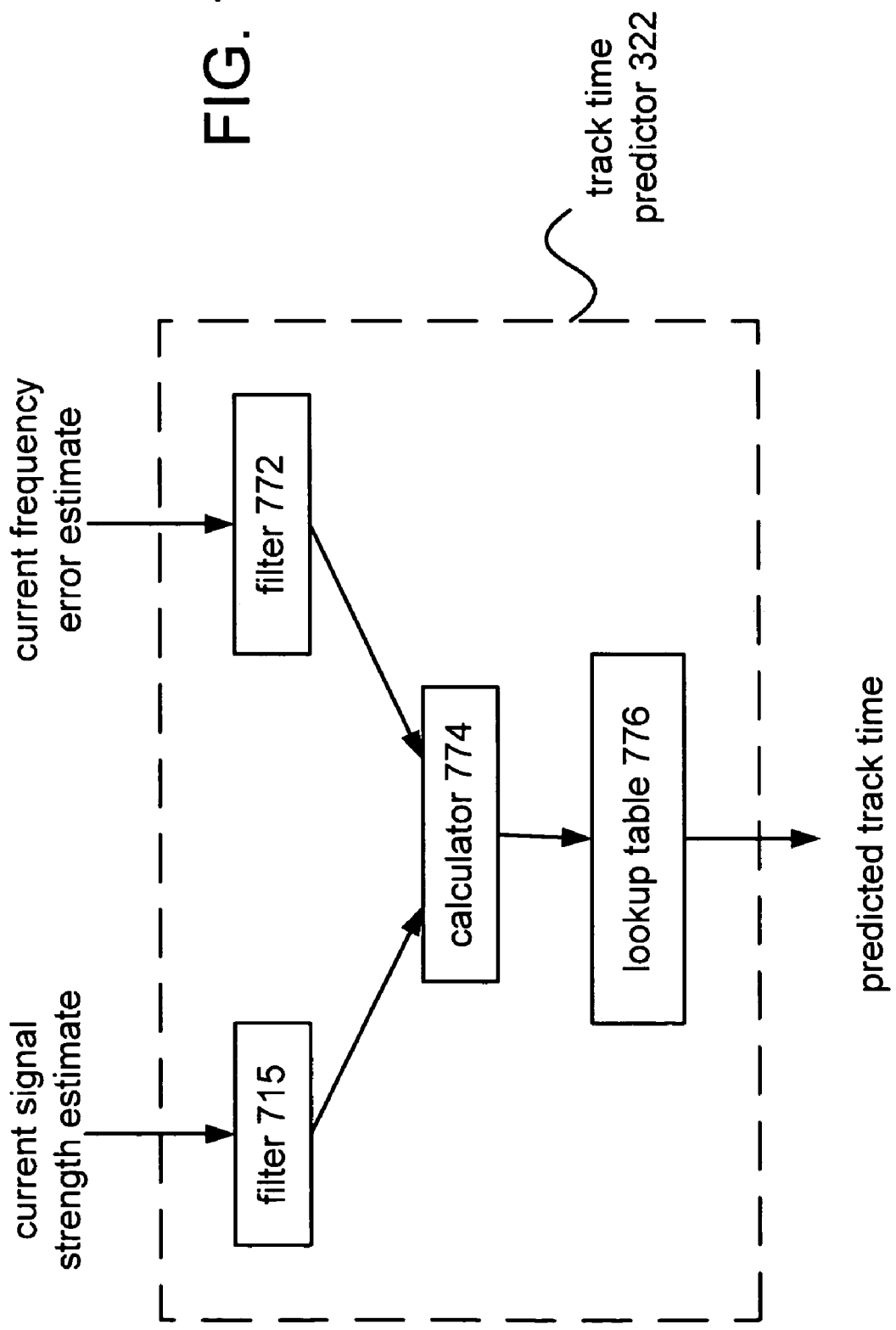
FIG. 16 shows a block diagram of an implementation 322 of track time predictor 320.

FIG. 16 shows a block diagram of an implementation 322 of track time predictor 320. Filter 715 is an implementation of filter 714 that is arranged to receive a current estimate of signal strength and is configured to have a memory of past signal strength values (from the current active period and/or from past active periods). Filter 772 is an implementation of filter 714 that is arranged to receive a current estimate of corrected frequency error and is configured to have a memory of past corrected frequency error values (from the current active period and/or from past active periods). Calculator 774 is configured to calculate a metric based on a weighted combination of the filtered signal strength and frequency error values, and lookup table 776 is configured to map ranges of the metric to corresponding predicted track times.

In a case where the WCD approaches and passes a base station with which it is communicating, a frequency change due to Doppler effects may be especially severe. When the WCD is moving fast between base station positions in an open area, such a crossing event may occur repeatedly. A history of signal strength measures may be used in such a situation to adapt the duty cycle of the DRX active/sleep schedule to the changing Doppler conditions. In another area, however, such as a rural area having fewer base stations, it may be more difficult to anticipate such a crossing event in advance.

Other measures that may be used to calculate the active period starting time include signal-to-noise ratio (SNR) and timing error (or a combination of these measures, possibly with signal strength and/or frequency error, or a history of one or both such measures, possibly with signal strength and/or frequency error). Typically, however, these conditions are not as significant as pilot signal strength and frequency error.

Figure 17:
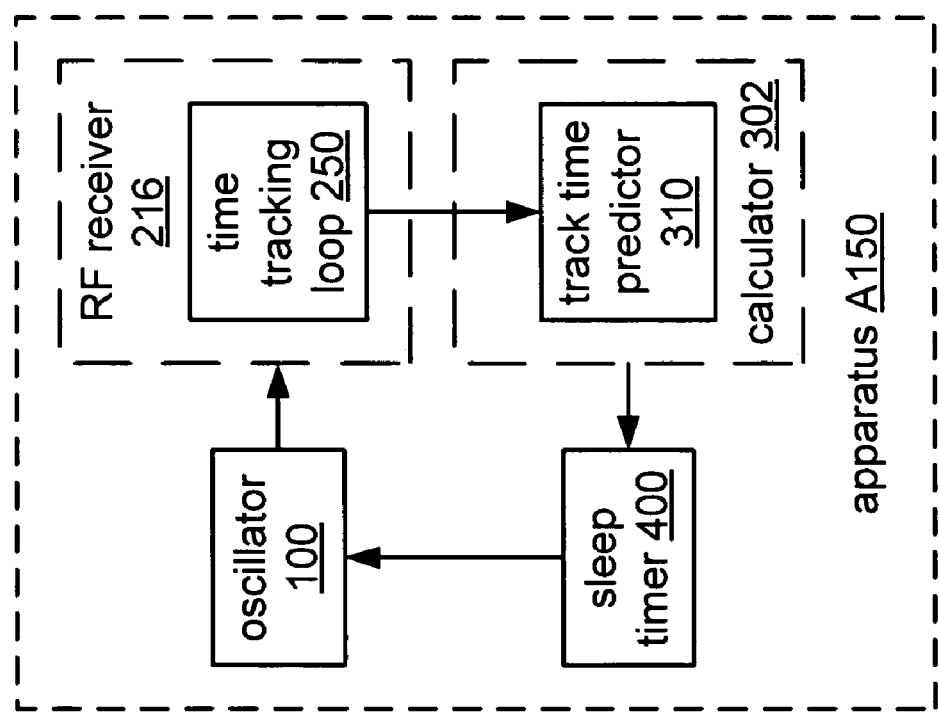
FIG. 17 shows a block diagram of an implementation A150 of apparatus A100.
Figure 18:
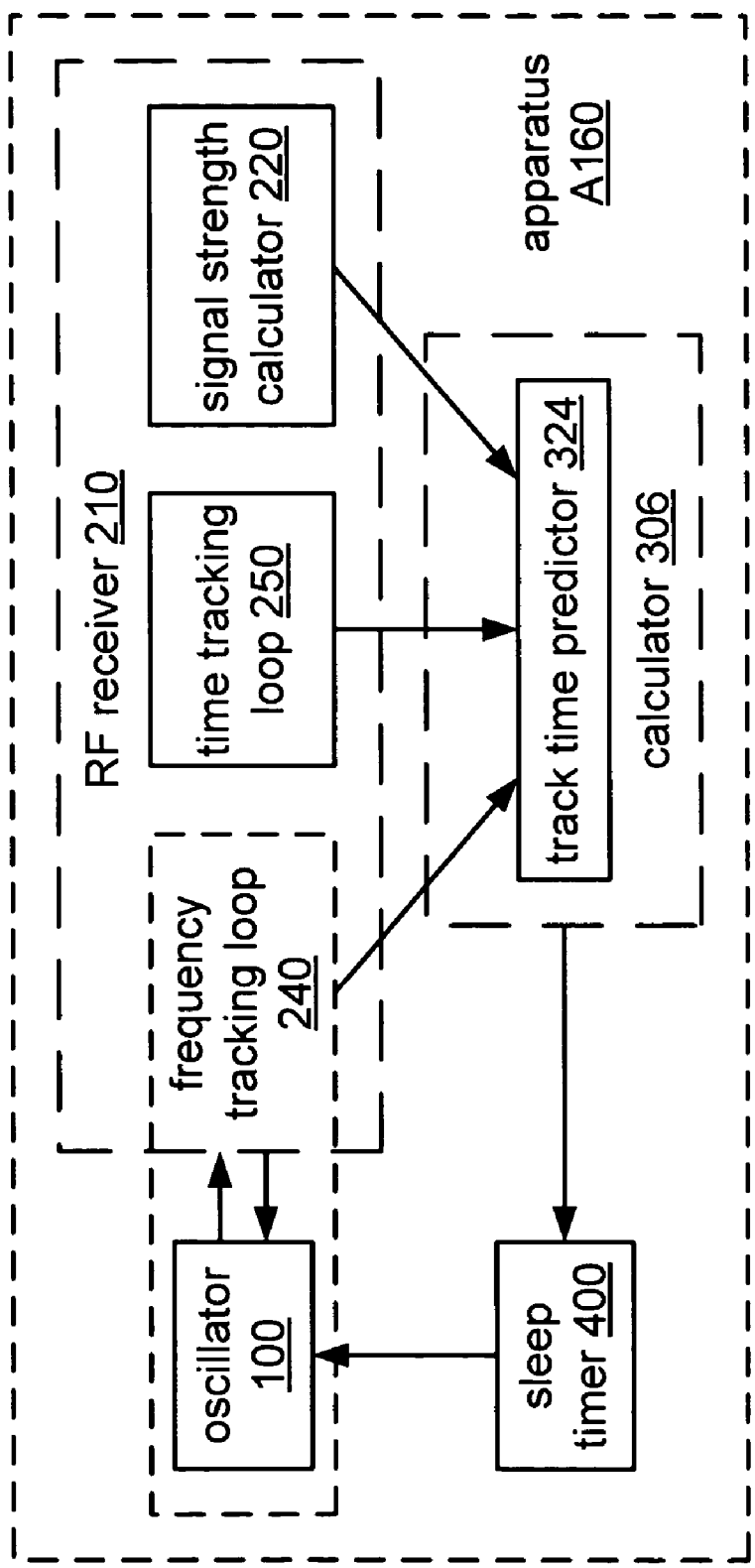
FIG. 18 shows a block diagram of an implementation A160 of apparatus A100.

FIG. 17 shows a block diagram of an implementation A150 of apparatus A100. Apparatus A150 includes an implementation 216 of RF receiver 200 that has a time tracking loop 250 arranged to output timing error values to track time predictor 310. FIG. 18 shows a block diagram of an implementation A160 of apparatus A100 that includes an implementation 218 of RF receiver 214 that also has time tracking loop 250. Apparatus A160 includes an implementation 324 of track time predictor 320 that is configured to calculate a predicted track time based on one or more values of signal strength from signal strength calculator 220, corrected frequency error from frequency tracking loop 240, and corrected timing error from time tracking loop 250.

Figure 19A:
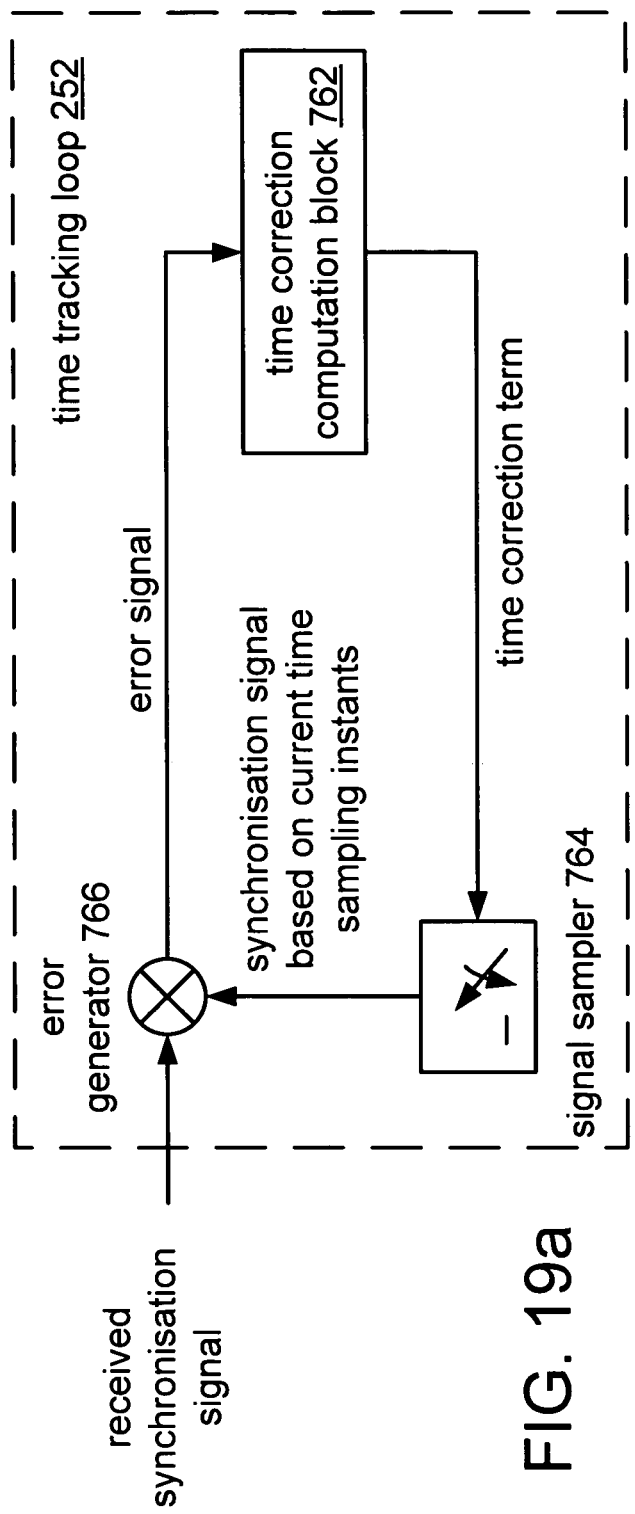
FIG. 19a shows a block diagram of an implementation 252 of time tracking loop 250.
Figure 19B:
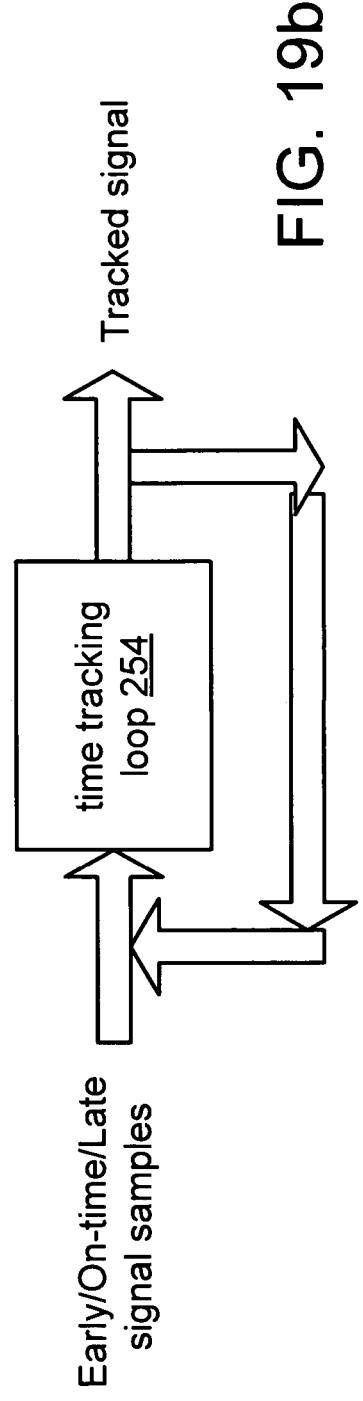
FIG. 19b shows a block diagram of an implementation 254 of time tracking loop 250.

FIG. 19a shows a block diagram of an implementation 252 of time tracking loop 250. An error generator 766 calculates an error signal according to a distance between a received synchronization signal and a synchronization signal that is based on current time sampling instants. For example, error generator 766 may be configured to correlate early and late versions of the received synchronization signal with a PN code generated according to a local estimate of system time. Based on the error signal, a time correction computation block 762 calculates a time correction term. For example, the time correction computation block may be configured to average and/or apply a gain factor to the error signal or to otherwise filter the error signal. A signal sampler 764 produces another instance of the synchronization signal according to the time correction term. FIG. 19b shows a block diagram of another implementation 254 of time tracking loop 250 that performs time tracking based on early and late samples of a signal to be tracked.

Figure 20:
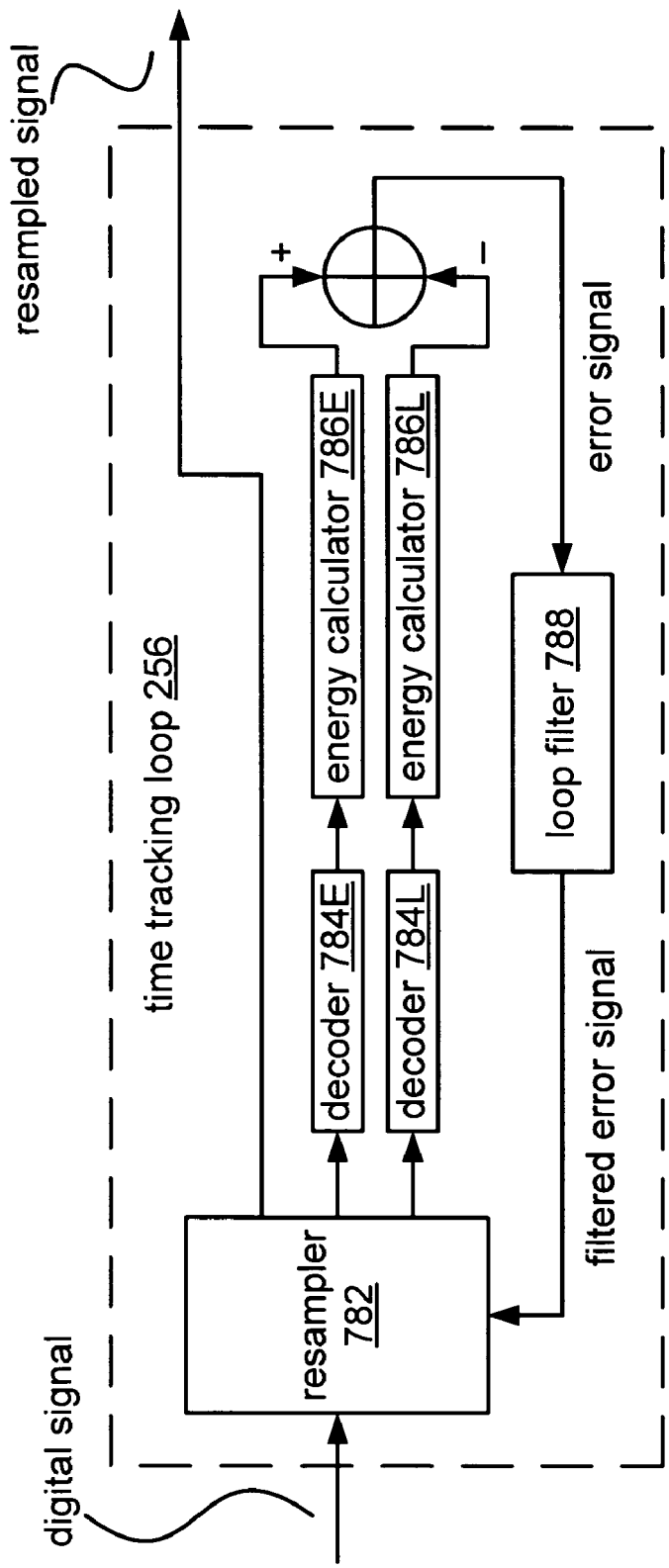
FIG. 20 shows a block diagram of an implementation 256 of time tracking loop 250.

Time tracking may be performed, for example, by selecting a chip boundary in an oversampled signal, by selecting a particular interpolation between samples, and/or by varying a frequency of a sampling clock. Such control is typically driven by a difference between energies of early and late versions of the received synchronization signal. FIG. 20 shows a block diagram of an implementation 256 of time tracking loop 250 that includes a resampler 782 configured to output a resampled signal according to a filtered error signal, which is calculated based on versions of the digitized received synchronization signal that are early and late by, for example, ½ chip.

Loop 256 may be configured to output an indication of the timing error to track time predictor 310 as the input or output of loop filter 788 (possibly integrated over some period, such as the period over which RF receiver 200 is active). Alternatively, time tracking loop 250 may be configured to output an indication of the timing error as a difference between the initial and final estimates of system time for the active period.

While paging intervals, paging signals, and paging indicator bits are described above, application of the principles described herein to any DRX system is expressly disclosed and contemplated. For example, principles as described herein may be applied to any situation that uses slotted paging or otherwise includes DRX cycles to monitor an intermittent signal.

The foregoing presentation of the described embodiments is provided to enable any person skilled in the art to make or use the present invention. Various modifications to these embodiments are possible, and the generic principles presented herein may be applied to other embodiments as well. For example, embodiments may use techniques for tracking time and/or frequency other than the particular examples described herein, and the starting time of the active period of a subsequent DRX cycle may be calculated from values of qualities based on the received wireless signal that have a different form than those particular examples described herein.

Embodiments may be implemented in part or in whole as a hard-wired circuit, as a circuit configuration fabricated into an application-specific integrated circuit. Embodiments may also be implemented in part or in whole as a firmware program loaded into non-volatile storage or a software program loaded from or into a data storage medium (e.g., semiconductor or magnetic random-access memory (volatile or nonvolatile, integrated or removable); magnetic, optical, or phase-change disc media, etc.) as machine-readable code, such code being instructions executable by one or more arrays of logic elements such as microcontrollers, microprocessors or other digital signal processing units, or finite state machines (whether such arrays or arrays are separate, integrated, and/or embedded). Thus, the present invention is not intended to be limited to the embodiments shown above but rather is to be accorded the widest scope consistent with the principles and novel features disclosed in any fashion herein.

What is claimed is:

1. A method of activity control, comprising:
receiving a signal during an active period of a first discontinuous reception (DRX) cycle;
determining an estimate of a characteristic of the signal;
calculating a predicted duration of a track time within a future DRX cycle to track frequency or timing for an active period of a second DRX cycle based on the estimate of the characteristic of the signal; and
scheduling start time of the second DRX cycle based on the predicted duration of the track time.

2. The method of activity control according to claim 1, wherein the estimate is based on correcting a frequency error of an oscillator with respect to the received signal.

3. The method of activity control according to claim 1, wherein the estimate is based on correcting a timing error with respect to the received signal.

4. The method of activity control according to claim 1, wherein the estimate is based on correcting a code phase error with respect to the received signal.

5. The method of activity control according to claim 1, wherein calculating the predicted duration of the track time includes calculating the predicted duration of the track time of at least one of a frequency tracking loop or a time tracking loop.

6. The method of activity control according to claim 5, wherein the calculating the predicted duration of the track time comprises:
determining frequency and timing errors accumulated during transient phases of demodulation of the received signal; and
adjusting the at least one of the frequency loop or the time tracking loop based on the determined frequency and timing errors.

7. The method of activity control according to claim 6, wherein the determining comprises analyzing a plurality of received signals based at least in part upon a convergence function according to worst-case channel conditions, the convergence function indicating the starting time of the second DRX cycle within a defined error tolerance.

8. The method of activity control according to claim 1, further comprising determining, during an active period of a third DRX cycle occurring prior to the first and second DRX cycles, a second estimate of a characteristic of a second signal based on a second received signal, wherein the calculating the predicted duration of the track time is based on the second estimate of the characteristic of the second signal.

9. The method of activity control according to claim 1, wherein scheduling the starting time includes selecting an interval from among a plurality of intervals.

10. The method of activity control according to claim 1, further comprising programming a sleep timer according to the scheduled starting time.

11. A non-transitory data storage medium having machine-executable instructions stored thereon, that if executed by a machine, cause the machine to execute the method of activity control according to claim 1.

12. The method of activity control according to claim 1, wherein determining the estimate of the characteristic of the signal is based on a plot signal-to-noise ratio.

13. The method of claim 1, wherein scheduling the start time of the second DRX cycle further comprises calculating backwards from a time when a paging signal is expected to arrive.

14. An apparatus for wireless communications, comprising:
an oscillator configured to produce a frequency reference;
a radio-frequency (RF) receiver arranged to receive the frequency reference and a signal during an active period of a first discontinuous reception (DRX) cycle according to the frequency reference;
a track time predictor configured to determine an estimate of a characteristic of the signal;
a calculator configured to calculate a predicted duration of a track time within a future DRX cycle to track frequency or timing for an active period of a second DRX cycle based on the estimate of the characteristic of the signal; and
a sleep timer configured to schedule a start time of the second DRX cycle based on the predicted duration of the track time and to activate the oscillator during the active period of the second DRX cycle.

15. The apparatus for wireless communications according to claim 14, wherein said apparatus includes a frequency tracking loop configured to correct a frequency error of the oscillator with respect to the received signal, wherein the calculator is configured to calculate the predicted duration of the track time based on the corrected frequency error.

16. The apparatus for wireless communications according to claim 14, wherein said RF receiver includes a time tracking loop configured to correct a timing error with respect to the received signal, wherein the calculator is configured to calculate the predicted duration of the track time based on the corrected timing error.

17. The apparatus for wireless communications according to claim 16, wherein the calculator is further configured to:
determine frequency and timing errors accumulated during transient phases of demodulation of the received signal; and
adjust the at least one of the frequency tracking loop or the time tracking loop based on the determined frequency and timing errors.

18. The apparatus for wireless communications according to claim 17, wherein the calculator is further configured to analyze a plurality of received signals based at least in part upon a convergence function according to worst-case channel conditions, the convergence function indicating the starting time of the second DRX cycle within a defined error tolerance.

19. The apparatus for wireless communications according to claim 14, wherein said RF receiver includes a code tracking loop configured to correct a code phase error with respect to the received signal, wherein said calculator is configured to calculate the predicted of the track time based on the corrected code phase error.

20. The apparatus for wireless communications according to claim 14, wherein the track time predictor is configured to estimate a second estimate of a characteristic of a second signal based on a second signal received during an active period of a third DRX cycle occurring prior to the first and second DRX cycles.

21. The apparatus for wireless communications according to claim 14, wherein the sleep timer is configured to select an interval from among a plurality of intervals and activate the oscillator according to the selected interval.

22. The apparatus for wireless communications according to claim 14, wherein said calculator is configured to calculate the predicted duration of the track time for at least one of a frequency error or a timing error.

23. The apparatus for wireless communications according to claim 14, wherein said apparatus includes a lookup table, and wherein said calculator is configured to select a value from said lookup table and wherein the sleep timer is configured to schedule the starting time based on the selected value.

24. The apparatus for wireless communications according to claim 14, wherein the apparatus is a portable wireless communication device.

25. The apparatus for wireless communications according to claim 14, wherein said apparatus is a cellular telephone.

26. The apparatus for wireless communications according to claim 14, wherein the track time predictor is further configured to determine the estimate of the characteristic of the signal based on a pilot signal-to-noise ratio.

27. The apparatus of claim 14, wherein the sleep timer is further configured to schedule the start time of the second DRX cycle by calculating backwards from a time when a paging signal is expected to arrive.

28. An apparatus for wireless communications, comprising:
  means for receiving a signal during an active period of a first discontinuous reception (DRX) cycle
  means for determining an estimate of a characteristic of the signal;
  means for calculating a predicted duration of a track time within a future DRX cycle to track frequency or timing for an active period of a second DRX cycle based on the estimate of the characteristic of the signal; and
  means for scheduling a start time of the second DRX cycle based on the predicted duration of the track time.

29. The apparatus for wireless communications according to claim 28, wherein said means for determining is configured to correct a frequency error of an oscillator with respect to the received signal.

30. The apparatus for wireless communications according to claim 28, wherein said means for determining is configured to correct a timing error with respect to the received signal.

31. The apparatus for wireless communications according to claim 28, wherein said means for determining is configured to correct a code phase error with respect to the received signal.

32. The apparatus for wireless communications according to claim 28, wherein said means for determining configured to estimate a second estimate of a characteristic of a second signal based on a second signal received during an active period of a third DRX cycle occurring prior to the first and second DRX cycle, wherein the means for calculating the predicted duration of the track time is configured to calculate the predicted duration of the track time based on the estimate of the characteristic of the second signal.

33. The apparatus for wireless communications according to claim 28, wherein said means for scheduling the starting time is configured to select an interval from among a plurality of intervals.

34. The apparatus for wireless communications according to claim 28, wherein said means for scheduling a starting time is configured to program a sleep timer according to the scheduling starting time.

35. The apparatus for wireless communications according to claim 28, wherein the apparatus is a portable wireless communication device.

36. The apparatus for wireless communications according to claim 28, wherein said apparatus is a cellular telephone.

37. The apparatus for wireless communications according to claim 28, wherein the means for determining further comprises determining the estimate of the characteristic of the signal based on a pilot signal-to-noise ratio.

38. The apparatus of claim 28, wherein the means for scheduling is further configured to schedule the start time of the second DRX cycle by calculating backwards from a time when a paging signal is expected to arrive.

39. A method of activity control, comprising:
  during an active period of a first discontinuous reception (DRX) cycle, receiving a wireless signal;
  during a paging slot within the active period of the first DRX cycle, monitoring a paging channel; and
  calculating, based on a received signal strength of the wireless signal, a starting time for an active period of a second DRX cycle subsequent to the first DRX cycle, wherein calculating the starting time includes:
  calculating a predicted track time of at least one of a frequency tracking loop or a time tracking loop by determining frequency and timing errors accumulated during transient phases of demodulation of the received signal strength of the wireless signal and adjusting the at least one of the frequency tracking loop or the time tracking loop based on the determined frequency and timing errors; and
  calculating the starting time based on the predicted track time.

40. The method of activity control according to claim 39, wherein determining the frequency and timing error further comprises analyzing a plurality of received wireless signals based at least in part upon a convergence function according to worst-case channel conditions, the convergence function indicating the starting time of the second DRX cycle within a defined error tolerance.

41. An apparatus for wireless communications, comprising:
  an oscillator configured to produce a frequency reference;
  a radio-frequency (RF) receiver arranged to receive the frequency reference, wherein the RF receiver is configured to receive a wireless signal according to the frequency reference;
  a sleep timer configured to activate the oscillator during an active period of each of a plurality of discontinuous reception (DRX) cycles;
  wherein the RF receiver is configured to monitor a paging channel during a paging slot within the active period of the first one of the plurality of DRX cycles and wherein the RF receiver includes a time tracking loop configured to correct a timing error with respect to the received signal; and
  a calculator configured to calculate, based on a received signal strength of the wireless signal and the corrected timing error, a starting time for an active period of a second one of the plurality of the DRX cycles that is subsequent to the first DRX cycle, wherein the calculator is further configured to:
  determine frequency and timing errors accumulated during transient phases of demodulation of the received signal strength of the wireless signal; and
  adjust the at least one of the frequency tracking loop or the time tracking loop based on the determined frequency and timing errors.

42. The apparatus for wireless communications according to claim 41, wherein the calculator is further configured to analyze a plurality of received wireless signals based at least in part upon a convergence function according to worst-case channel conditions, the convergence function indicating the starting time of the second DRX cycle within a defined error tolerance.

43. An apparatus for wireless communications, comprising:
  means for receiving a wireless signal during an active period of a first discontinuous reception (DRX) cycle, wherein the means for receiving is configured to monitor a paging channel during a paging slot within the active period of the first DRX cycle and wherein the means for receiving includes means for correcting a timing error with respect to the received signal; and
  means for calculating, based on a received signal strength of the wireless signal and the corrected timing error, a starting time for an active period of a second DRX cycle subsequent to the first DRX cycle, wherein the means for calculating is further includes:
    means for determining frequency and timing errors accumulated during transient phases of demodulation of the received signal strength of the wireless signal; and
    means for adjusting the at least one of the frequency tracking loop or the time tracking loop based on the determined frequency and timing errors.

44. The apparatus for wireless communications according to claim 43, wherein the means for calculating is further include means for analyzing a plurality of received wireless signals based at least in part upon a convergence function according to worst-case channel conditions, the convergence function indicating the starting time of the second DRX cycle within a defined error tolerance.

* * * * *